US012330180B2

(12) United States Patent
Fontenit et al.

(10) Patent No.: US 12,330,180 B2
(45) Date of Patent: Jun. 17, 2025

(54) RETRACTABLE CLEANING NOZZLE

(71) Applicant: Definox SAS, Clisson (FR)

(72) Inventors: Sébastien Fontenit, La Gaubretiere (FR); Thierry Picot, Vallet (FR); Mathieu Bachelier, Saint-Lumine-de-Clisson (FR)

(73) Assignee: DEFINOX SAS, Clisson (FR)

( * ) Notice: Subject to any disclaimer, the term of this patent is extended or adjusted under 35 U.S.C. 154(b) by 228 days.

(21) Appl. No.: 17/980,872

(22) Filed: Nov. 4, 2022

(65) Prior Publication Data

US 2023/0191439 A1 Jun. 22, 2023

(30) Foreign Application Priority Data

Dec. 17, 2021 (EP) .................................... 21215450

(51) Int. Cl.
*B05B 15/74* (2018.01)
*B05B 1/14* (2006.01)
(Continued)

(52) U.S. Cl.
CPC ................ *B05B 15/74* (2018.02); *B05B 1/14* (2013.01); *B08B 9/0321* (2013.01); *B08B 9/093* (2013.01);
(Continued)

(58) Field of Classification Search
None
See application file for complete search history.

(56) References Cited

U.S. PATENT DOCUMENTS 2,990,120 A 6/1961 Reynolds
3,804,338 A 4/1974 Williams, 3rd et al.
(Continued)

FOREIGN PATENT DOCUMENTS

DE 20 2005 004 711 U1 7/2005
EP 0 295 325 A1 12/1988
EP 3 824 996 A1 5/2021

OTHER PUBLICATIONS

Extended European Search Report, issued in Priority Application No. 21215450.4, dated May 27, 2022.
(Continued)

*Primary Examiner* — Spencer E. Bell
(74) *Attorney, Agent, or Firm* — Birch, Stewart, Kolasch & Birch, LLP

(57) ABSTRACT

A retractable cleaning nozzle for spray cleaning an interior surface of a pipe or a tank includes a nozzle housing configured to be stationary mounted in a hole of the side wall of the pipe or tank and having a front side arranged to face towards the interior of the pipe or tank and a rear side arranged to face away from the interior of the pipe or tank, an inlet port configured for receiving a cleaning fluid, and a cylindrical interior bore with a central axis defining an axial direction, wherein the interior bore is open towards the front side of the nozzle housing. The cleaning nozzle includes a first plug movably arranged in the axial direction within the bore of the nozzle housing between a retracted position and a protruding position, wherein the first plug has a sleeve-shaped body with a front wall closing a front portion of the sleeve-shaped body, wherein the front wall of the sleeve-shaped body includes a first set of spray holes configured to eject cleaning fluid substantially in the axial direction, wherein the sleeve-shaped body of the first plug includes a second set of spray holes configured to eject cleaning fluid substantially in a radial direction perpendicular to the axial
(Continued)

direction, wherein a front surface of the first plug is substantially flush with a front surface of the nozzle housing in the retracted position of the first plug, and wherein a front portion of the first plug, including the first and second set of spay holes, protrudes beyond the front surface of the nozzle housing in the protruding position of the first plug for enabling spray cleaning of the interior surface of the pipe or tank. The cleaning nozzle includes a second plug arranged within a space defined by the sleeve-shaped body of the first plug and configured for closing a flow path from the inlet port to the first set of holes of the first plug when the first plug is located in the retracted position.

18 Claims, 12 Drawing Sheets

(51) Int. Cl.
*B08B 9/032* (2006.01)
*B08B 9/093* (2006.01)

(52) U.S. Cl.
CPC ..... *B08B 2209/032* (2013.01); *B08B 2209/08* (2013.01)

(56) References Cited

U.S. PATENT DOCUMENTS

| | | | |
|---|---|---|---|
| 5,794,854 | A | 8/1998 | Yie |
| 9,566,617 | B2 | 2/2017 | Jensen |
| 2015/0314343 | A1 | 11/2015 | Savic |
| 2020/0030860 | A1 | 1/2020 | Andersen |

OTHER PUBLICATIONS

"Alfa Laval SaniMidget Retractor," Alfa Laval, accessed on Jan. 27, 2025, 5 pages total.
"CIP Nozzles," RML, Aug. 11, 2021, pp. 1-13, URL: <https://rminz.com/components/cip-nozzles/>.

36
70
71
45
54
1
38
44
41
34
58
59
46
36
34
27
35
37
45
47
54
55

30
9
7
17
15
2
26
22
3
14
16
12
25
11
20
10
13
42
57
28
5
3
6

4
14
16
7
15
8
2
11
10
9
AD
RD

A-A

RETRACTABLE CLEANING NOZZLE

TECHNICAL FIELD

The present disclosure relates to a retractable cleaning nozzle for spray cleaning an interior surface of a pipe or a tank, as well as a method for spray cleaning an interior surface of a pipe or a tank using a retractable cleaning nozzle.

The retractable cleaning nozzle according to the disclosure can be mounted in the wall of a tank or a pipe that requires periodic cleaning, such as for example in the pharmaceutical industry, food processing industry, brewery industry, chemical industry, or the like.

BACKGROUND

In the field of cleaning nozzles for spray cleaning an interior surface of a pipe or a tank, there is a continuous demand for further improvement in terms of cleaning efficiency and high hygienic standard.

For example, document EP0295325A1 shows a retractable cleaning nozzle that may be substantially flush with the interior surface of the tank in retracted state, while providing radially directed spray of cleaning fluid when set in a protruding state.

This type of retractable cleaning nozzles provides a high level of hygienic standard, because the flush mounting in retracted states efficiently reduces the space for retention of fluid product, thereby reducing risk for bacterial growth.

However, despite the activities in the field, there is still a demand for further improved cleaning nozzle in terms of cleaning efficiency combined with a high hygienic standard.

SUMMARY

An object of the present disclosure is to provide an improved retractable cleaning nozzle in terms of cleaning efficiency and high hygienic standard. This object is at least partly achieved by the features of the independent claims.

According to a first aspect of the present disclosure, there is provided a retractable cleaning nozzle for spray cleaning an interior surface of a pipe or a tank. The cleaning nozzle comprising: a nozzle housing configured to be stationary mounted in a hole of the side wall of the pipe or tank and having a front side arranged to face towards the interior of the pipe or tank and a rear side arranged to face away from the interior of the pipe or tank, an inlet port configured for receiving cleaning fluid, and a cylindrical interior bore with a central axis defining an axial direction, wherein the interior bore is open towards the front side of the nozzle housing; a first plug movably arranged in the axial direction within the bore of the nozzle housing between a retracted position and a protruding position, wherein the first plug has a sleeve-shaped body with a front wall closing a front portion of the sleeve-shaped body, wherein the front wall of the sleeve-shaped body includes a first set of spray holes configured to eject cleaning fluid substantially in the axial direction, wherein the sleeve-shaped body of the first plug includes a second set of spray holes configured to eject cleaning fluid substantially in a radial direction perpendicular to the axial direction, wherein a front surface of the first plug is substantially flush with a front surface of the nozzle housing in the retracted position of the first plug, and wherein a front portion of the first plug, including the first and second set of spay holes, protrudes beyond the front surface of the nozzle housing in the protruding position of the first plug for enabling spray cleaning of the interior surface of the pipe or tank; and a second plug arranged within a space defined by the sleeve-shaped body of the first plug and configured for closing a flow path from the inlet port to the first set of holes of the first plug when the first plug is located in the retracted position.

According to a second aspect of the present disclosure, there is provided a method for spray cleaning an interior surface of a pipe or a tank using a retractable cleaning nozzle. The cleaning nozzle has a nozzle housing stationary mounted in a hole of a side wall of the pipe or tank, wherein the nozzle housing has a front side facing towards the interior of the pipe or tank and a rear side facing away from the interior of the pipe or tank. The nozzle housing further has an inlet port for receiving a cleaning liquid, a cylindrical interior bore with a central axis defining an axial direction, a first plug movably arranged in the axial direction within the bore and a second plug, the method comprising: controlling a linear actuator operatively connected to the moveable first plug for moving the first plug from the a retracted position to a protruding position, in which a front portion of the first plug, including a first and a second set of spay holes, protrudes into the tank or pipe, thereby initiating ejection of cleaning fluid via the first set of spray holes of the first plug substantially in the axial direction, and initiating ejection of cleaning fluid via the second set of spray holes of the first plug substantially in a radial direction perpendicular to the axial direction; and controlling the linear actuator for moving the first plug from the protruding position to the retracted position, in which a front surface of the first plug is substantially flush with a front surface of the nozzle housing, and in which the second plug closes the flow path from the inlet port to the first set of spray holes of the first plug.

In this way, the cleaning nozzle may still be mounted substantially flush with the interior surface of the tank or pipe, thereby maintaining a high hygienic standard, while also providing improved cleaning efficiency due to the combined forwards and sideways spray of cleaning fluid in the protruding operating state of the nozzle.

Further advantages are achieved by implementing one or several of the features of the dependent claims.

In some example embodiments, the retractable cleaning nozzle further comprises a first sealing arrangement for sealing the first plug to the nozzle housing, in particular for sealing an annular space between the first plug and the nozzle housing, and a second sealing arrangement for sealing the second plug to the first plug, in particular for sealing an annular space between the second plug and the first plug. Sealing the flow of cleaning liquid using said annular space enables use of cost-efficient, reliable and easily replaced sealing rings.

In some example embodiments, that may be combined with any one or more of the above-described embodiments, the first sealing arrangement is arranged for sealing an annular space between a radially outer surface of the first plug and a radially inner surface of the nozzle housing. Sealing the flow of cleaning liquid using said annular space enables use of cost-efficient, reliable and easily replaced sealing rings.

In some example embodiments, that may be combined with any one or more of the above-described embodiments, the second sealing arrangement is arranged for sealing the second plug to the first plug in the retracted position of the first plug only. Thereby, automatic closure and sealing of the ejection flow is accomplished by merely moving first plug from protruding to retracted position.

In some example embodiments, that may be combined with any one or more of the above-described embodiments, the first plug further has a central cylindrical operating stem extending in the axial direction, and the second plug has a central cylindrical hole extending in the axial direction and configured to receive the operating stem of the first plug. The centrally arranged operating stem enables compact design and implementation of a rotatable first plug.

In some example embodiments, that may be combined with any one or more of the above-described embodiments, the retractable cleaning nozzle further comprises a third sealing arrangement for sealing an annular space between a radially inner surface of the second plug and a radially outer surface of the first plug. Thereby, there is no leakage along said operating stem.

In some example embodiments, that may be combined with any one or more of the above-described embodiments, the first sealing arrangement is arranged for sealing the first plug to the nozzle housing in the retracted position of the first plug only. Thereby, the first sealing arrangement may be located close to the front side of the first plug and thus providing a very small space for a working product in the retracted position.

In some example embodiments, that may be combined with any one or more of the above-described embodiments, the first and second sealing arrangements, specifically the first, second and third sealing arrangements, are located substantially in same radial plane when the first plug is in retracted position. This may enable a good sealing performance due to good force transfer through the seals in the retracted position.

In some example embodiments, that may be combined with any one or more of the above-described embodiments, the retractable cleaning nozzle further comprises a fourth sealing arrangement for sealing the first plug to the nozzle housing in the protruding position of the first plug. Thereby, more cleaning liquid is forced to be ejected via dedicated spray holes.

In some example embodiments, that may be combined with any one or more of the above-described embodiments, the second and fourth sealing arrangements, specifically the second, third and fourth sealing arrangements, are located substantially in same radial plane when the first plug is in protruding position. This may enable a good sealing performance due to good force transfer through the seals in the protruding position.

In some example embodiments, that may be combined with any one or more of the above-described embodiments, the first and/or second and/or third and/or fourth sealing arrangement is a sealing ring, in particular an O-ring. This provides a cost-efficient design.

In some example embodiments, that may be combined with any one or more of the above-described embodiments, the nozzle housing and the first and second plugs are made of stainless steel or the like. This provides a strong, reliable and hygienic design.

In some example embodiments, that may be combined with any one or more of the above-described embodiments, the first sealing arrangement is mounted in an annular recess in a radially outer surface of a front portion of the sleeve-shaped body of the first plug, and the fourth sealing arrangement is mounted in an annular recess in a radially outer surface of a rear portion of the sleeve-shaped body of the first plug. Thereby, automatic closure and sealing of the ejection flow is accomplished by merely moving first plug from protruding to retracted position.

In some example embodiments, that may be combined with any one or more of the above-described embodiments, the essentially flat front surface of the first plug extends to the first sealing arrangement, in the radial direction. This ensures a very small volume for working product entering the cleaning nozzle.

In some example embodiments, that may be combined with any one or more of the above-described embodiments, the second plug includes a central cylindrical shaft with a radially outwards extending flange at a front end thereof, wherein a forwards facing, preferably flat, surface of the flange abuts against a corresponding rearwards faced surface of the front wall of the first plug. This ensures a very small volume for working product entering the cleaning nozzle.

In some example embodiments, that may be combined with any one or more of the above-described embodiments, the first set of spray holes are closed on rear side of said spray holes by the second plug. This ensures a very small volume for working product entering the cleaning nozzle.

In some example embodiments, that may be combined with any one or more of the above-described embodiments, the retractable cleaning nozzle is free from a member located in front of the first set of spray holes. Thereby, the cleaning nozzle may have a flat front surface that is flush with surrounding surface of the pipe or tank.

In some example embodiments, that may be combined with any one or more of the above-described embodiments, the second sealing arrangement is mounted in an annular recess in a radially outer surface of the flange of the second plug, and third sealing arrangement is mounted in an annular recess in a radially inner surface of the flange of the second plug. This may enable a good sealing performance due to good force transfer through the seals.

In some example embodiments, that may be combined with any one or more of the above-described embodiments, the nozzle housing as an inlet port for receiving cleaning fluid, and the cleaning fluid is configured to flow from the inlet port to the first and second set of spray holes via an annular passage defined by the second sealing arrangement and a radially inner surface of the sleeve-shaped portion of the first plug, in the protruding position of the first plug. Thereby, an easily sealed flow path to the first and second sets of spray holes is provided.

In some example embodiments, that may be combined with any one or more of the above-described embodiments, the nozzle housing as an inlet port for receiving cleaning fluid, and the cleaning fluid is configured to be stopped from being ejected by means of the first and second sealing arrangements, in the retracted position of the first plug. Thereby, an easily sealed flow path to the first and second sets of spray holes is provided.

In some example embodiments, that may be combined with any one or more of the above-described embodiment, the retractable cleaning nozzle further comprises a linear actuator operatively connected to the moveable first plug for controlling movement of the first plug between the retracted position and protruding position. Thereby, accurate and reliable control of the motion of the first plug is accomplished.

In some example embodiments, that may be combined with any one or more of the above-described embodiment, the linear actuator includes a stationary actuator housing, a linearly moveable actuating member and a driving member operatively connected with the actuating member, wherein the stationary actuator housing is rigidly attached to the stationary nozzle housing, and the actuating member is operatively connected to the first plug for controlling movement of the moveable first plug between the retracted position and protruding position. Thereby, accurate and reliable control of the motion of the first plug is accomplished.

In some example embodiments, that may be combined with any one or more of the above-described embodiment, the retractable cleaning nozzle further comprises a rotating mechanism arranged to cause the first plug to become angularly displaced a predetermined angle, such as for example in the range of 5-175 degrees, specifically in the range of 20-110 degrees, around its central longitudinal axis during each activation event, which involves moving the first plug from the retracted position to the protruding position, and back to the retracted position again. Thereby, accurate and reliable control of the rotating motion of the first plug is accomplished.

In some example embodiments, that may be combined with any one or more of the above-described embodiment, the rotating mechanism is arranged to cause the first plug to become angularly displaced a first predetermined angle around its central longitudinal axis during motion of the first plug from the retracted position to the protruding position, and arranged to cause the first plug to become angularly displaced a second predetermined angle around its central longitudinal axis during motion of the first plug from the protruding position to the retracted position. Thereby, the rotating mechanism may be made more compact.

In some example embodiments, that may be combined with any one or more of the above-described embodiment, the rotating mechanism includes: at least one radially protruding guide member rotationally connected with the first plug and a cam member rotationally connected with the stationary nozzle housing or actuator housing, or at least one radially protruding guide member rotationally connected with stationary nozzle housing or actuator housing and a cam member rotationally connected with the first plug; wherein the cam member has at least one cam-surface inclined with respect to the axial direction and configured for interacting with the at least one radially protruding guiding member for inducing a controlled rotation of the first plug upon motion of the first plug from the retracted position to the protruding position, and back to the retracted position again. The use of a cam member interacting with guide member enables cost-efficient and reliable combined axial and rotational motion using merely a linear actuator.

In some example embodiments, that may be combined with any one or more of the above-described embodiment, the rotating mechanism includes a set of at least two radially protruding guide members rotationally connected with a piston of a pneumatic linear actuator, and a cam member rotationally secured to the stationary actuator housing, wherein the piston is rigidly connected and rotationally secured to the first plug, and wherein the cam member has at least two cam-surfaces inclined with respect to the axial direction and configured for interacting with the radially protruding guiding members for inducing a controlled rotation of the piston and first plug upon motion of the piston and first plug from the retracted position to the protruding position, and back to the retracted position again. Thereby, the rotating mechanism may be implemented in the linear actuator.

In some example embodiments, that may be combined with any one or more of the above-described embodiment, the cam member of the rotating mechanism includes first and second annular sleeves mutually joined and axially overlapping, wherein each of the first and second annular sleeves includes at least one cam-surface inclined with respect to the axial direction, wherein the at least one radially protruding guide member is configured for interacting with the at least one cam-surface of the first annular sleeve when the first plug moves from the retracted position to the protruding position, and wherein the at least one radially protruding guide member is configured for interacting with the at least one cam-surface of the second annular sleeve when the first plug moves from the protruding position to the retracted position. This provides a compact cam member having simplified manufacturing.

In some example embodiments, that may be combined with any one or more of the above-described embodiment, the rotating mechanism is arranged such that 4-24 consecutive activation events, specifically, 6-12 consecutive activation events, will result in the first plug performing a full turn. This enables increased ejection pressure due to reduced spray hole area.

In some example embodiments, that may be combined with any one or more of the above-described embodiment, the linear actuator is a pneumatically or hydraulically operated single-acting cylinder-piston actuator with a mechanical spring for biasing the piston towards a rear position of the piston, wherein the cylinder-piston actuator further includes a bearing arranged between the mechanical spring and the piston for simplifying relative rotation of the mechanical spring and piston. This provides simplified control of the actuator.

In some example embodiments, that may be combined with any one or more of the above-described embodiment, the second plug is movably arranged relative to the first plug in the axial direction and spring-loaded towards a front side of the nozzle housing for providing improved sealing contact with the first plug, in particular with the front wall and/or the sleeve-shaped body of the first plug. This provides improved sealing performance between first and second plugs.

In some example embodiments, that may be combined with any one or more of the above-described embodiment, the linear actuator is a pneumatically or hydraulically operated cylinder-piston actuator, wherein the second plug extends into an actuator housing, and wherein a mechanical spring of the second plug is located in the actuator housing and abuts a rear side of the second plug and front side of the piston. This provides a compact design.

In some example embodiments, that may be combined with any one or more of the above-described embodiment, the first set of spray holes provided on the front wall of the sleeve-shaped body are arranged in one or more individual front clusters of spray holes, wherein each hole of an individual front cluster is located within a circular sector that having a central angle of not more than 90 degrees, specifically with a circular sector that having a central angle of not more than 45 degrees. This provides maintained liquid ejection pressure with reduced supply pressure, or increased liquid ejection pressure with maintained supply pressure.

In some example embodiments, that may be combined with any one or more of the above-described embodiment, the front surface of first plug has a substantially flat surface arranged in a plane perpendicular to the axial direction, and the first set of spray holes is arranged in said substantially flat surface. This provides a flush surface of the cleaning nozzle.

In some example embodiments, that may be combined with any one or more of the above-described embodiment, the first set of spray holes provided on the front wall of the sleeve-shaped body are arranged in two oppositely located individual front clusters of spray holes, wherein each front cluster includes about 5-15 holes. This provides maintained liquid ejection pressure with reduced supply pressure, or increased liquid ejection pressure with maintained supply pressure.

In some example embodiments, that may be combined with any one or more of the above-described embodiment, the first set of spray holes provided on the front wall of the sleeve-shaped body are arranged to eject cleaning liquid with in an angular range of at least 0-30 degrees with respect to the axial direction, and the second set of spray holes provided in the sleeve-shaped body are arranged to eject cleaning liquid with in an angular range of about 45-135 degrees with respect to the axial direction. This enables a cleaning nozzle with very good coverage of the adjacent interior surface of the tank or pipe.

The disclosure also relates to an assembly comprising: a tank or a pipe; and a retractable cleaning nozzle as described above, wherein the nozzle housing of the retractable cleaning nozzle is stationary mounted in a hole of a side wall of the pipe or the tank with a front side arranged to face towards the interior of the tank or pipe.

In some example embodiments, that may be combined with any one or more of the above-described embodiment, the retractable cleaning nozzle further comprises a rotating mechanism arranged to cause the first plug to become angularly displaced a predetermined angle, around its central longitudinal axis during each activation event, which involves moving the first plug from the retracted position to the protruding position, and back to the retracted position again, the method comprises repeating the steps of controlling the linear actuator to move the first plug from the a retracted position to a protruding position, and subsequently to move the first plug back from the protruding position to the retracted position, for at least four times, specifically at least eight times, during a cleaning event, for providing at least one full turn of the first plug during a cleaning event.

Further features and advantages of the invention will become apparent when studying the appended claims and the following description. The skilled person in the art realizes that different features of the present disclosure may be combined to create embodiments other than those explicitly described hereinabove and below, without departing from the scope of the present disclosure.

BRIEF DESCRIPTION OF DRAWINGS

The retractable cleaning nozzle and associated method of use according to the disclosure will be described in detail in the following, with reference to the attached drawings, in which.

DESCRIPTION OF EXAMPLE EMBODIMENTS

Various aspects of the disclosure will hereinafter be described in conjunction with the appended drawings to illustrate and not to limit the disclosure, wherein like designations denote like elements, and variations of the described aspects are not restricted to the specifically shown embodiments, but are applicable on other variations of the disclosure.

Figure 1:
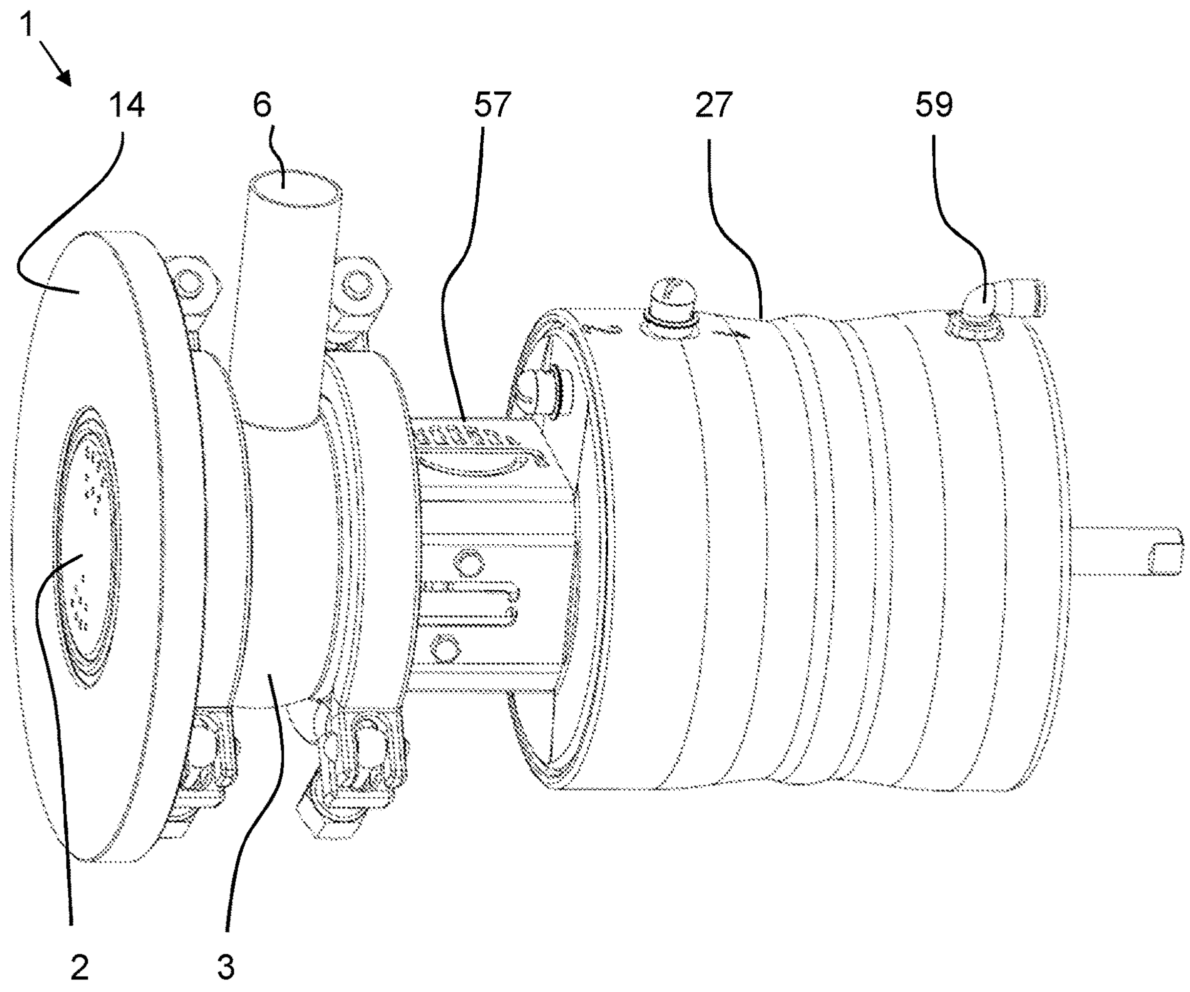
FIG. 1 shows schematically a perspective view of an example embodiment of the cleaning nozzle.

FIG. 1 schematically shows a perspective view of a first example embodiment of the retractable cleaning nozzle 1 for spray cleaning an interior surface of a pipe or a tank according to the disclosure. As discussed more in detail below, the cleaning nozzle 1 has a first plug 2 movably arranged in the axial direction AD between a retracted position and a protruding position, and in FIG. 1 the first plug 2 is located in the retracted position.

Figures 2A, 2B, 2C, 2D:
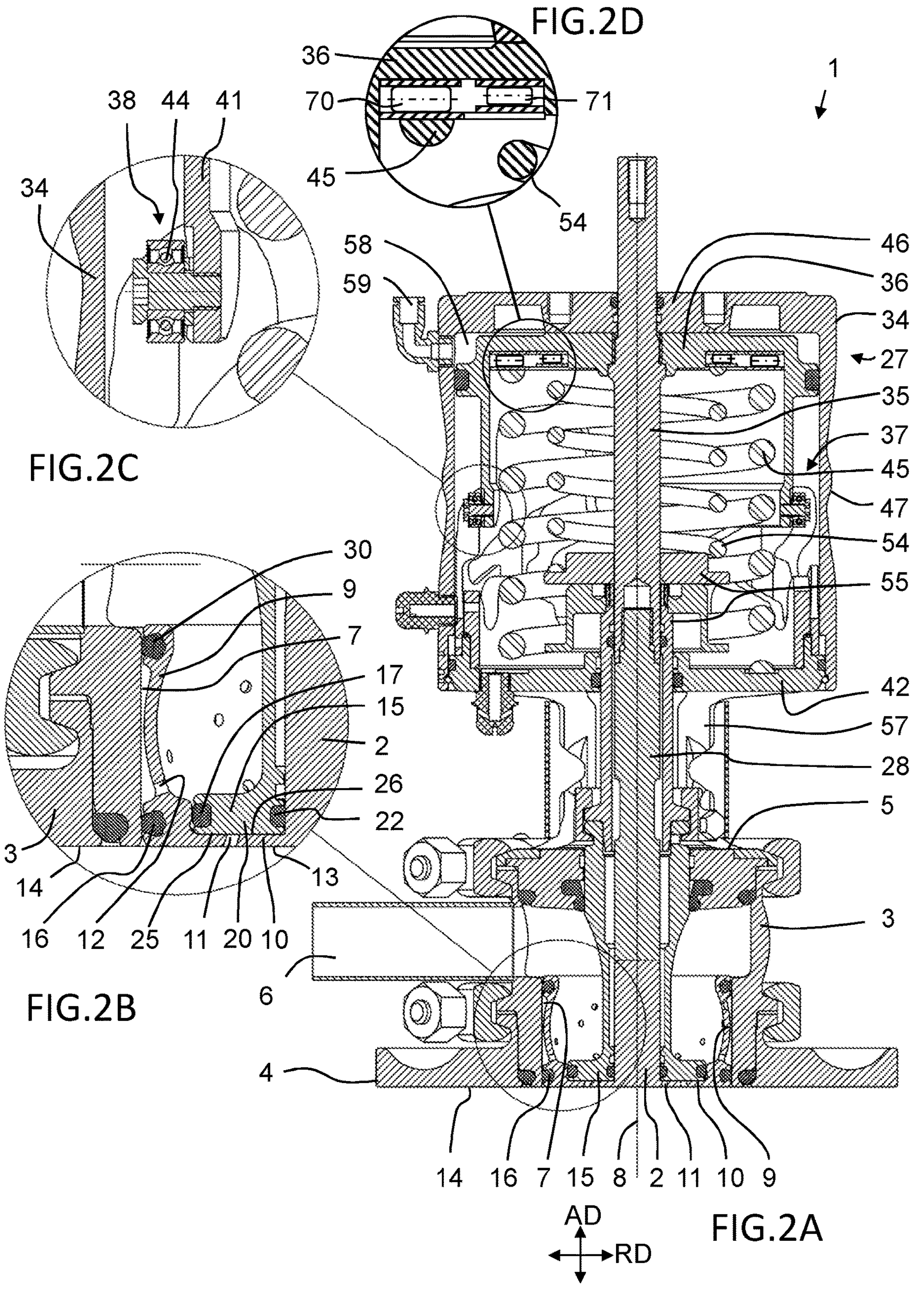
FIG. 2A-2D show a cross-section of an example embodiment of the cleaning nozzle in retracted state.

FIG. 2A shows a cross-section of the cleaning nozzle 1 of FIG. 1 with the first plug in the retracted position, and FIGS. 2B, 2C and 2D are magnifications of certain parts of the cleaning nozzle of FIG. 2A.

Figures 3A, 3B:
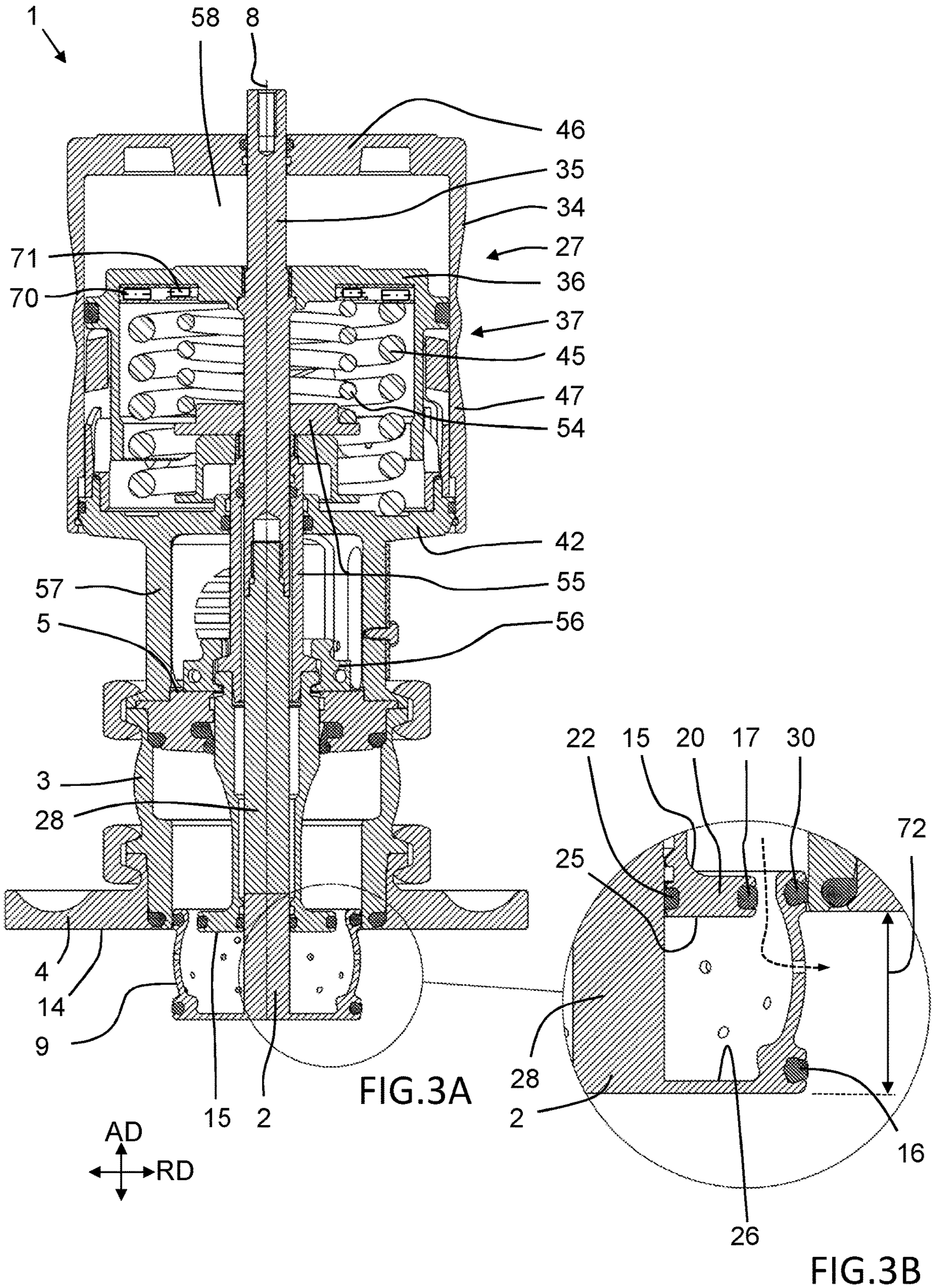
FIG. 3A-3B show a cross-section of the cleaning nozzle of FIGS. 2A-2D in protruding state.

FIG. 3A shows a cross-section of the cleaning nozzle 1 of FIG. 1 with the first plug in the protruding position, and FIG. 3B is a magnification of a portion of the cleaning nozzle of FIG. 3A.

With reference to FIGS. 1, 2A-2D and 3A-3B, the retractable cleaning nozzle 1 comprises a nozzle housing 3 configured to be stationary mounted in a hole of the side wall of the pipe or tank and having a front side 4 arranged to face towards the interior of the pipe or tank and a rear side 5 arranged to face away from the interior of the pipe or tank, an inlet port 6 configured for receiving cleaning fluid, and a cylindrical interior bore 7 with a central axis 8 defining the axial direction AD, wherein the interior bore 7 is open towards the front side 4 of the nozzle housing 3.

The retractable cleaning nozzle 1 further comprises the first plug 2 movably arranged in the axial direction AD within the bore 7 of the nozzle housing 3 between a retracted position and a protruding position. The first plug 2 has a sleeve-shaped body 9 with a front wall 10 closing a front portion of the sleeve-shaped body 9.

The front wall 10 of the sleeve-shaped body 9 includes a first set of spray holes 11 configured to eject cleaning fluid substantially in the axial direction AD. The sleeve-shaped body of the first plug further includes a second set of spray holes 12 configured to eject cleaning fluid substantially in a radial direction RD perpendicular to the axial direction AD.

Cleaning fluid located within the sleeve-shaped body 9 may thus only escape out from the interior of the sleeve-shaped body 9 either forwards through the first set of spray holes 11, radially outwards through the second set of spray holes 12, or rearwards.

A front surface 13 of the first plug 2 is substantially flush with a front surface 14 of the nozzle housing 3 in the retracted position of the first plug 2, and a front portion of the first plug 2, including the first and second set of spay holes 11, 12, protrudes beyond the front surface 14 of the nozzle housing 3 in the protruding position of the first plug 2 for enabling spray cleaning of the interior surface of the pipe or tank.

The retractable cleaning nozzle 1 further comprises a second plug 15 arranged within a space defined by the sleeve-shaped body 9 of the first plug 2 and configured for closing a flow path from the inlet port to the first set of spray holes 11 of the first plug 2 when the first plug 2 is located in the retracted position.

Thereby, a retractable cleaning nozzle 1 is provided that not only is substantially flush over entire surface facing the interior surface of the tank or pipe for ensuring a high hygienic standard, the cleaning nozzle 1 is also able to eject cleaning fluid both substantially in the axial direction AD and substantially in a radial direction RD for ensuring improved cleaning efficiency.

In some example embodiments, the retractable cleaning nozzle further comprises a first sealing arrangement 16 for sealing the first plug 2 to the nozzle housing 3, and a second sealing arrangement 17 for sealing the second plug 15 to the first plug 2.

Specifically, in the example embodiment of FIGS. 2A-3B, the first sealing arrangement 16 is configured for sealingly closing a passage between the first plug 2 and the nozzle housing 3, i.e. for sealing an annular space between the first plug 2 and the nozzle housing 3.

More in detail, the first sealing arrangement may be arranged for sealing an annular space between a radially outer surface of the first plug 2 and a radially inner surface of the nozzle housing 3, in particular between a radially outer surface of the first plug 2 and a radially inner surface of the interior bore 7 of the nozzle housing 3. Thereby, the cleaning fluid is prevented from leaking out from the cleaning nozzle through the annular space defined by the radially outer surface of the first plug 2 and the radially inner surface of the interior bore 7 of the nozzle housing 3 when the first plug 2 is located in the retracted position.

In fact, in the example embodiment of the cleaning nozzle of FIGS. 1-3B, the first sealing arrangement 16 seals the first plug 2 to the nozzle housing 3 in the retracted position of the first plug 2 only, because the first sealing arrangement 16 protrudes out from the nozzle housing 3 when the first plug 2 is in the protruding position, i.e. is not in contact with the nozzle housing 3 when the first plug 2 is in the protruding position.

Consequently, the portion of the sleeve-shaped body 9 having the second set of spray holes 12 protrudes out and beyond the front surface 14 of the nozzle housing 3 in the protruding position of the first plug 2, and the portion of the sleeve-shaped body 9 having the second set of spay holes 12 is located within the nozzle housing 3 and being sealed from the interior of the pipe or tank by means of the first sealing arrangement 16 in the retracted position of the first plug 2.

With reference to FIG. 3B, the first plug 2 may protrude a distance 72 of about 5-100 mm from the front surface 14 of the housing 3 in the protruding position, and be substantially flush with front surface 14 in the retracted position.

Figure 4C:
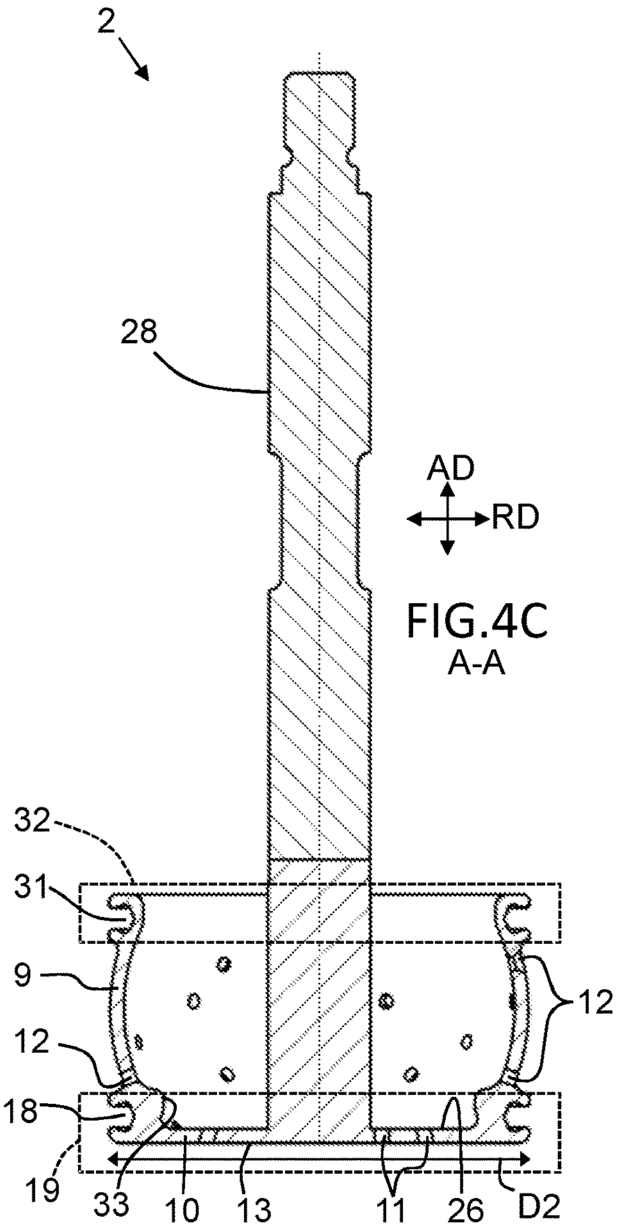
FIG. 4A-4C show various views of the first plug of the cleaning nozzle of FIGS. 2A-2D and 3A-3B.
Figure 4A:
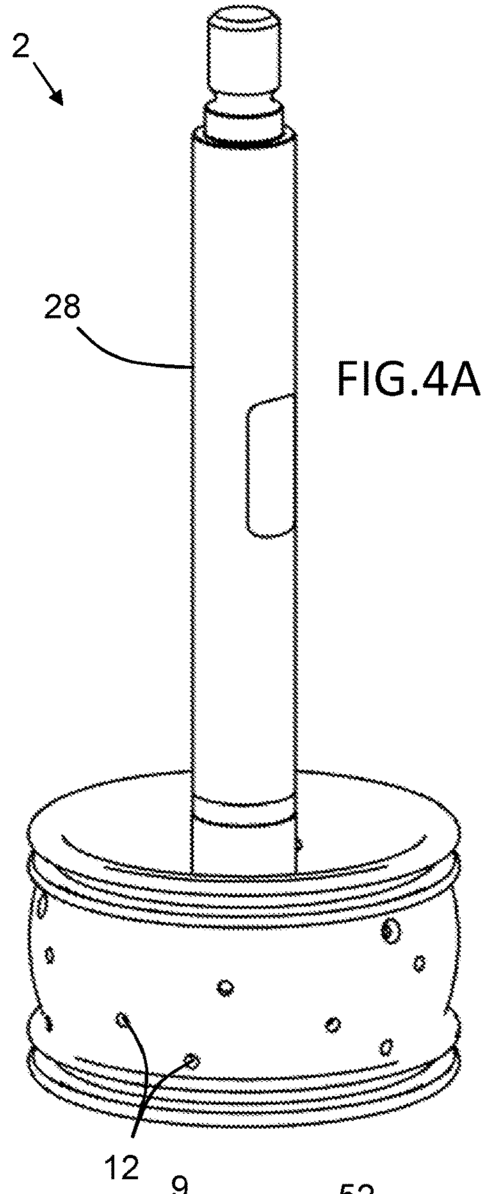
Figure 4B:
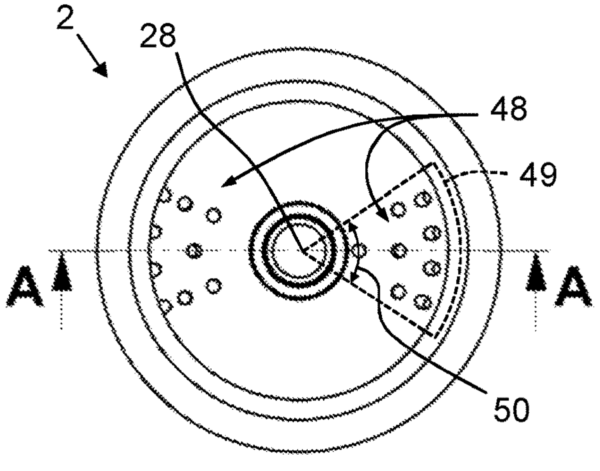

FIG. 4A shows a perspective view of the first plug 2 in dismounted state, i.e. detached from the nozzle housing 3, and FIG. 4B shows a rear view of the first plug 2 and FIG. 4C shows a cross-sectional view along cut A-A of FIG. 4B.

With reference to FIGS. 1-4C, the first sealing arrangement 16 is mounted in an annular recess 18 in a radially outer surface of a front portion 19 of the sleeve-shaped body 9 of the first plug 2. Thereby, the first sealing arrangement 16 is located relatively close to a front surface of the first plug 2, such that only a little fluid product may enter the cleaning nozzle 1 when the first plug 2 is located in the retracted position.

The front surface 13 of first plug 2 has a substantially flat surface arranged in a plane perpendicular to the axial direction AD, and the first set of spray holes 11 is arranged in said substantially flat front surface 13. This feature contributes to the flush front surface of the cleaning nozzle, thereby reducing the risk for contamination caused by possible dirt or bacterial growth getting stuck in recess of the cleaning nozzle. Furthermore, by arranging the first set of spray holes 11 in said substantially flat front surface 13, ejection of cleaning fluid in the axial direction AD, or at least substantially in the axial direction AD, is enabled.

The substantially flat front surface 13 of first plug 2 in a plane perpendicular to the axial direction AD defines an angle of about 90 degrees with a direction of elongation of the sleeve-shaped body 9 of the first plug 2. In other words, the front wall 10 of first plug 2 together with the sleeve-shaped body 9 of the first plug 2 defines a piston-shaped hollow structure similar to those typically found in a combustion engine, where the piston crown corresponds to the front wall 10 of the first plug 2, and the piston skirt corresponds to the sleeve-shaped body 9 of the first plug 2.

The annular recess 18 for holding the first sealing arrangement 16 is located in the front portion 19 of the sleeve-shaped body 9, in particular in a corner region of the first plug 2, at which the front wall 10 and sleeve-shaped body 9 meet.

Consequently, the essentially flat front surface 13 of first plug 2 extends primarily in the radial direction RD out to the first sealing arrangement 16.

In the example embodiment of FIGS. 2A-3B, the second sealing arrangement 17 is configured for sealing an annular space between the second plug 15 and the first plug 2. Specifically, the second sealing arrangement 17 is arranged for sealing an annular space located between a radially outer surface of a front flange 20 of the second plug 15 and a radially inner surface 33 of the front portion of the first plug 2.

Consequently, in this example embodiment of the cleaning nozzle, the second sealing arrangement 17 seals the second plug 15 to the first plug 2 in the retracted position of the first plug 2 only. In the protruding position of the first plug 2, the second sealing arrangement 17 does not seal the second plug 15 to the first plug 2.

As a result, with reference to in particularly FIGS. 2A and 3B, the nozzle housing 3 has an inlet port 6 for receiving cleaning fluid and the cleaning fluid is configured to flow from the inlet port 6 to the first and second set of spray holes 11, 12 via an annular passage defined by the second sealing arrangement 17 and a radially inner surface of the sleeve-shaped portion 9 of the first plug 3, in the protruding position of the first plug 2.

For the same reason, the cleaning fluid is configured to be stopped from being ejected first and second set of spray holes 11, 12 by means of the first and second sealing arrangements 16, 17, in the retracted position of the first plug 2, in particular because the first sealing arrangement 16 seals and closes the annular space between the radially outer surface of the first plug 2 and radially inner surface of the interior bore 7 of the nozzle housing 3, and the second sealing arrangement 17 seals and closes the annular passage between the radially inner surface 33 of the sleeve-shaped portion 9 of the first plug 3 and the radially outer surface of the second plug 15.

Consequently, the retractable cleaning nozzle may be free from a closing member located in front of the first set of spray holes 11, i.e. free from a member located in front of the first plug and configured for stopping the flow of cleaning liquid through the first set of spray holes 11 when the first plug 2 shifts from protruding position to retracted position. As a result, the cleaning nozzle may be provided with a very flat and flush front surface.

Figure 5C:
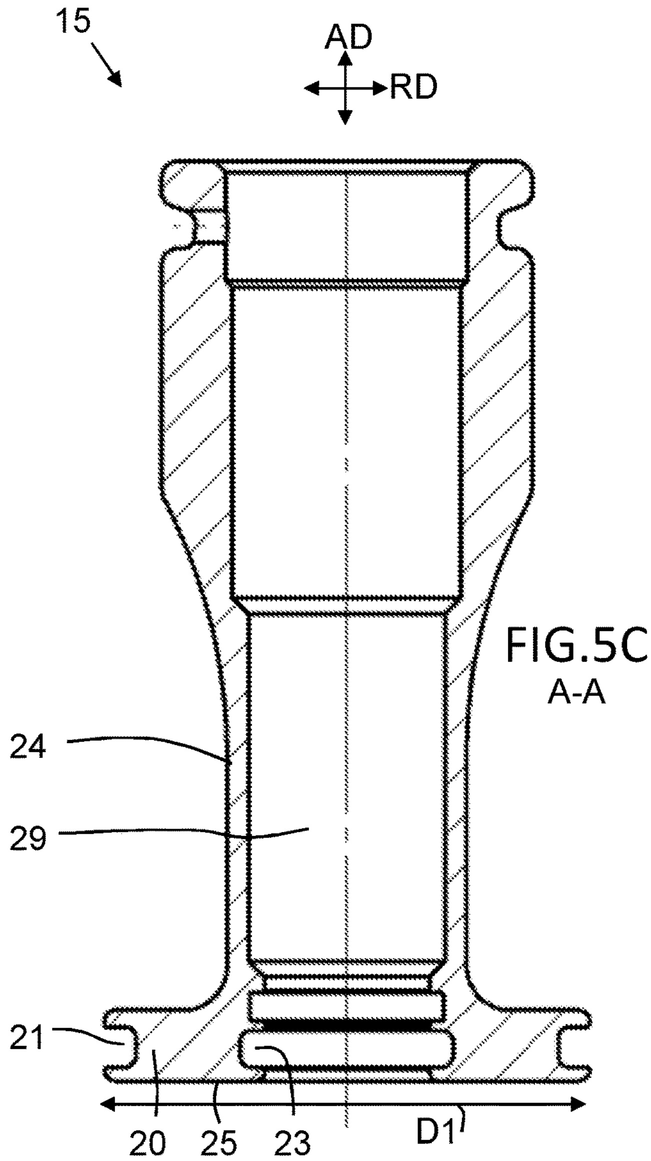
FIG. 5A-5C show various views of the second plug of the cleaning nozzle of FIGS. 2A-2D and 3A-3B, FIG. 6A-6C show various views of the cam member of the cleaning nozzle of FIGS. 2A-2D and 3A-3B, FIG. 7A-7C show various views of the piston of the cleaning nozzle of FIGS. 2A-2D and 3A-3B, FIG. 8A-8B show cross-sections of a further example embodiment of the cleaning nozzle in retracted and protruding states.
Figure 5A:
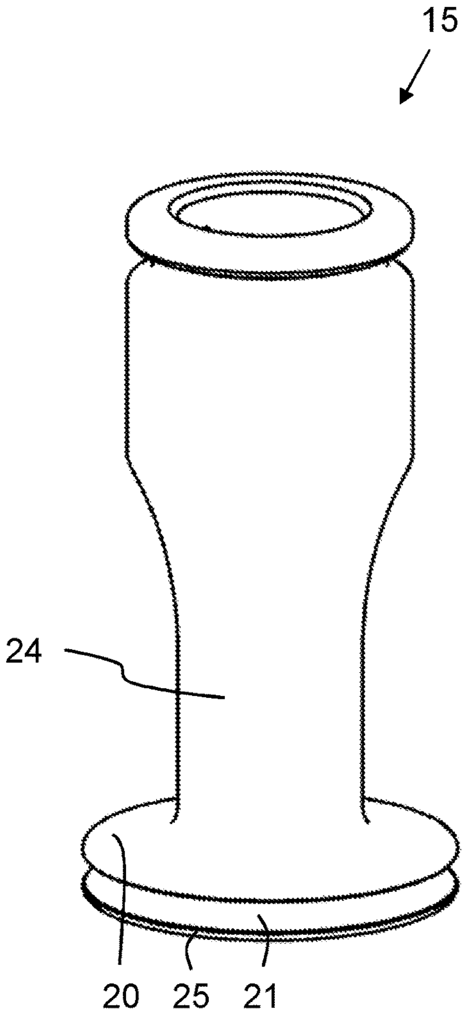
Figure 5B:
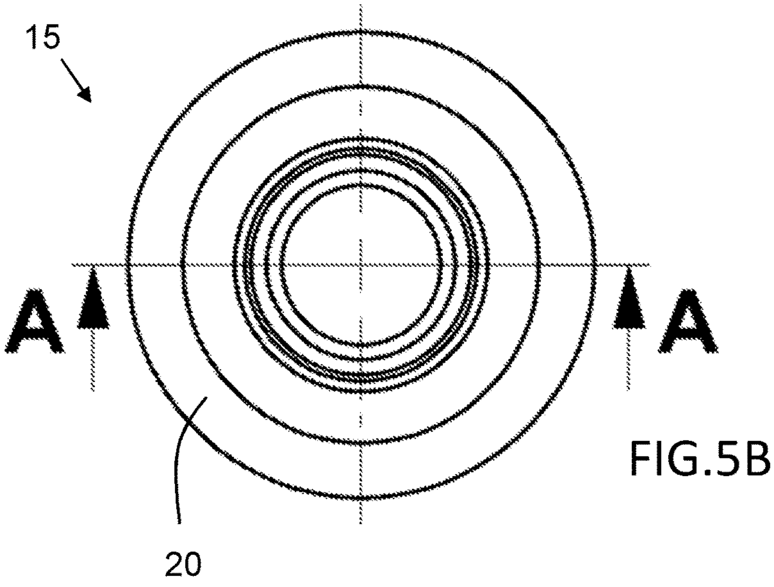

FIG. 5A shows a perspective view of the second plug 15 in dismounted state, i.e. detached from the nozzle housing 3, and FIG. 5B shows a rear view of the second plug 2 and FIG. 5C shows a cross-sectional view along cut A-A of FIG. 5B.

In this example embodiment of the cleaning nozzle, the second sealing arrangement 16 is mounted in an annular recess 21 in a radially outer surface of the flange 20 of the second plug 15.

When the first plug 2 is located in the retracted position, the first set of spray holes 11 is closed by means of the second plug 15. Specifically, the second plug 15 may include a central cylindrical shaft 24 having the radially outwards extending flange 20 at a front end thereof, and a forwards facing, preferably flat, surface 25 of the flange 20 abuts against a corresponding rearwards faced surface 26 of the front wall 10 of the first plug 2. Furthermore, the second sealing arrangement 17 ensures that cleaning fluid cannot reach the first set of spray holes 11, and that fluid product within the tank or pipe cannot enter the cleaning nozzle 1.

An outer diameter D1 of the radially outwards extending flange 20 at the front end of the second plug 15 may be at least 50% of an outer diameter D2 of the front surface 13 of the first plug 2 for enabling the first set of spray holes 11 to be positioned over relatively large useful area of the front surface 13 of the first plug 2.

Actuation of the first plug 2 between the retracted and protruding position may be accomplished in various ways. For example, the retractable cleaning nozzle 1 may include a linear actuator 27 operatively connected to the moveable first plug 2 for controlling movement of the first plug 2 between the retracted position and protruding position.

The linear actuator 27 may for example be a pneumatic, hydraulic or electric operated linear actuator.

In some example embodiments, the first plug 2 may include a central cylindrical operating stem 28 extending in the axial direction and operably connected to the linear actuator 27. The operating stem 28 may for example be connected to, or integrally formed with, the front wall 10 of the first plug 2.

In such an arrangement, the second plug 15 may have a central cylindrical hole 29 extending in the axial direction AD and configured to receive the operating stem 28 of the first plug 2 and to enable relative motion between the first and second plugs 2, 15.

In other words, the operating stem 28 of the first plug 2 may extend through the second plug 15 and be operatively connected to the linear actuator 27 on the rear side of the second plug 15. The second plug 15 may thus be telescoped on the operating stem 28 of the first plug 2.

Furthermore, forwards motion of the operating stem 28 would result in forwards motion of the first plug 2, while the second plug 15 may remain more or less stationary, thereby causing the cleaning nozzle to shift from a passive state, in which the first plug 2 is in the retracted position, to an active cleaning state, in which the first plug 2 is in the protruding position.

In addition, in this example embodiment of the cleaning nozzle, a third sealing arrangement 22 may be mounted in an annular recess 23 in a radially inner surface of the flange 20 of the second plug 15 for sealing a passage between a radially inner surface of the second plug 15 and a radially outer surface of the first plug 2 or the operating stem 28 of first plug 2.

In some example embodiments, the first and second sealing arrangements 16, 17 are located substantially in same radial plane when the first plug 2 is in the retracted position. Being located substantially in same radial plane means herein that the seals are displaced not more than 5 mm from each other in axial direction AD. This enables reduced space in which a liquid product from the tank or pipe may enter into the cleaning nozzle in retracted position of the first plug 2, as well as efficient and reliable radial compression of said sealing arrangements between the bore 7 of the housing 3 and the operating stem 28 of the first plug 2.

Similarly, in some example embodiments, the first, second and third sealing arrangements may be located substantially in same radial plane, when the first plug is in retracted position. This enables further reduced space in which a liquid product from the tank or pipe may enter into the cleaning nozzle in retracted position of the first plug 2, as well as further improved radial compression of said sealing arrangement between the bore 7 of the housing 3 and the operating stem 28 of the first plug 2.

In some example embodiments, the cleaning nozzle 1 may include a fourth sealing arrangement 30 for sealing the first plug 2 to the nozzle housing 3 in the protruding position of the first plug 2. In particular, the fourth sealing arrangement 30 is arranged for sealing an annular space between the sleeve-shaped body 9 of first plug 2 and the radially interior surface of the interior bore 7 the nozzle housing 3. Thereby, an ejection leakage flow of cleaning fluid between the first plug 2 and nozzle housing 3 in the protruding position of the first plug 2 may be reduced, thereby increasing the ejection flow out through the first and second sets of spray holes 11, 12.

In fact, the fourth sealing arrangement 30 may be seated in radially outwards facing annular recess 31 located at a rear portion 32 of the sleeve-shaped body 9, and may be arranged for being in sliding contact with the radially interior surface of the interior bore 7 during the displacement of the first plug 2 between the retracted and protruding positions, thereby reducing the risk that the fourth sealing arrangement 30 accidentally and unintentionally escapes from the annular recess 31.

Consequently, the first sealing arrangement 16 is mounted in an annular recess 18 in a radially outer surface of the front portion 19 of the sleeve-shaped body 9 of the first plug 2, and the fourth sealing arrangement 30 is mounted in an annular recess 31 in a radially outer surface of a rear portion 32 of the sleeve-shaped body 9 of the first plug 2.

In some example embodiments, the second and fourth sealing arrangements 17, 30, and in particular the second, third and fourth sealing arrangements 17, 22, 30, are located substantially in same radial plane when the first plug 2 is in the protruding position. Being located substantially in same radial plane means herein that the seals are displaced not more than 5 mm from each other in axial direction AD. This enables efficient and reliable radial compression of said sealing arrangements between the bore 7 of the housing 3 and the operating stem 28 of the first plug 2 in the protruding position.

The various sealing arrangements describes above may be implemented using various types of annular seals, such as O-rings or the like. Hence, the first sealing arrangement may be implemented as a sealing ring, in particular an O-ring. The second sealing arrangement may also be implemented a sealing ring, in particular an O-ring. The third sealing arrangement may be implemented as a sealing ring, in particular an O-ring. Also the fourth sealing arrangement may be implemented as a sealing ring, in particular an O-ring.

The cleaning nozzle is generally made of metal material, such as stainless steel or similar type of hygienic material. Consequently, each of the nozzle housing and the first and second plugs may be made of stainless steel or the like.

As schematically illustrated in FIGS. 2A and 3A, the linear actuator 27 may be implemented as a pneumatic cylinder having a stationary actuator housing 34 and a driving member in form of a piston 36 operatively connected with a central actuating member 35. The piston 36 being operable by supplying pressurized air into a pressure chamber 58 of the cylinder via an air supply connector 59. The stationary actuator 34 housing may be rigidly attached to the stationary nozzle housing 3, and the actuating member 35 may be operatively connected with the operating stem 28 of the first plug 2 for controlling movement of the moveable first plug 2 between the retracted position and protruding position.

The linear actuator 27 may however alternatively be implemented as a hydraulic cylinder, or an electric linear actuator having for example a driving member in form of a threaded nut engaged with a linearly moveable threaded rod acting as actuating member.

If the first and/or second set of spray holes 11, 12 of the first plug 2 are substantially evenly distributed and a sufficiently large ejection pressure of the cleaning liquid is reached, the cleaning nozzle may generate a satisfactory cleaning performance of the interior surface of the tank or pipe without a rotating mechanism arranged to cause the first plug to rotate.

However, in certain situations, for example when the fluid pressure of the supplied cleaning fluid is relatively low for same reason, the ejection pressure of the cleaning liquid may be too low when there are a relatively large number of spray holes. Such a situation may for example occur when the cleaning liquid pump used for supplying the cleaning liquid to the cleaning nozzle 1 has a relatively small capacity for enabling a more cost-efficient and energy-efficient design of the cleaning system.

Consequently, for accomplishing a relatively long operating distance of the cleaning nozzle while avoiding use of a large, costly and powerful pump, the cleaning nozzle 1 may be provided with a relatively small number of spray holes. Thereby, the ejection pressure of the cleaning liquid at the spray holes may be upheld despite use of a smaller pump capacity. Furthermore, for accomplishing a satisfactory cleaning result despite use of fewer spray holes, the retractable cleaning nozzle may include a rotating mechanism for rotating the first plug during use of the cleaning nozzle 1. Thereby, satisfactory cleaning performance is accomplished in combination with a more cost-efficient and energy-efficient pump design.

In other words, according to some example embodiments, the retractable cleaning nozzle 1 may include a rotating mechanism 37 arranged to cause the first plug 2 to become angularly displaced a predetermined angle, such as for example in the range of 5-175 degrees, specifically in the range of 20-110 degrees, around its central longitudinal axis during each activation event, which involves moving the first plug 2 from the retracted position to the protruding position, and back to the retracted position again.

With reference to FIGS. 2A, 2C, 3A, 6A-C and 7A-C, according to some example embodiments, the rotating mechanism 37 includes at least one radially protruding guide member 38 rotationally connected with the first plug 2 and a cam member 39 rotationally connected with the stationary actuator housing 34, wherein the cam member 39 may have at least one cam-surface 40 inclined with respect to the axial direction AD and configured for interacting with the at least one radially protruding guiding member 38 for inducing a controlled rotation of the first plug 2 upon motion of the first plug 2 from the retracted position to the protruding position, and back to the retracted position again.

In the example embodiment of FIGS. 2A, 2C, 3A, 6A-C and 7A-C, the rotating mechanism 37 includes four radially protruding guide members 38 distributed around the circumference of a sleeve member 41 associated with the piston 36, which is rotationally connected with the first plug 2 via the actuating member 25 and operating stem 28.

In some example embodiments, the rotating mechanism 37 may be arranged to cause the first plug 2 to become angularly displaced a first predetermined angle around its central longitudinal axis during motion of the first plug 2 from the retracted position to the protruding position. The rotating mechanism 37 is further arranged to cause the first plug 2 to become angularly displaced a second predetermined angle around its central longitudinal axis during motion of the first plug 2 from the protruding position to the retracted position.

Hence, during each activation event, which involves moving the first plug 2 from the retracted position to the protruding position, and back to the retracted position again, the piston 36 and thereto connected first plug 2 will perform two individual rotational movements, one when the piston 36 moves forward and the first plug 3 moves from the retracted position to the protruding position, and one when the piston 36 moves rearwards and the first plug 2 moves from the protruding position to the retracted position.

This two-step motion of the piston 36 is caused by design of the sleeve member 41 of the stationary actuator housing 34, which design involves two cam surfaces for each guide member 38 and activation event. In detail, a first cam surface 40 interacts with the protruding guide member 38 during the piston forwards motion, and a further cam surface 43 interacts with the protruding guide member 38 during the piston rearwards motion.

Figure 6B:
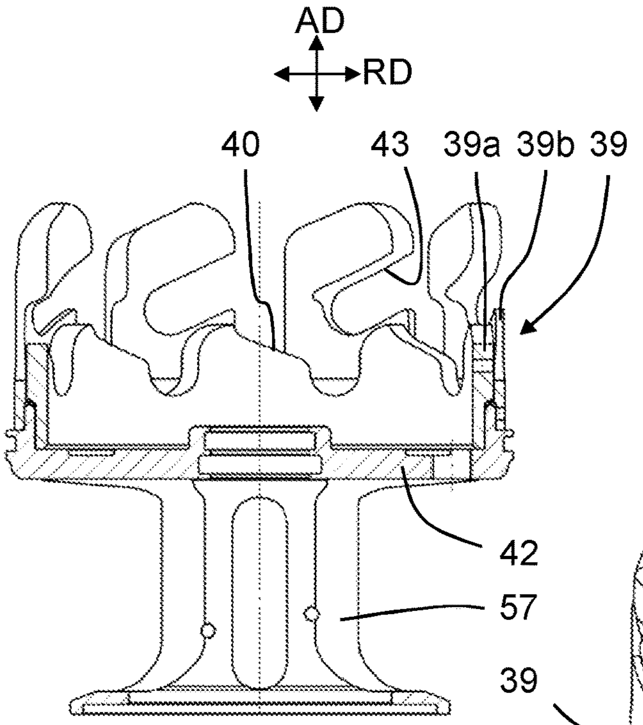
Figure 6A:
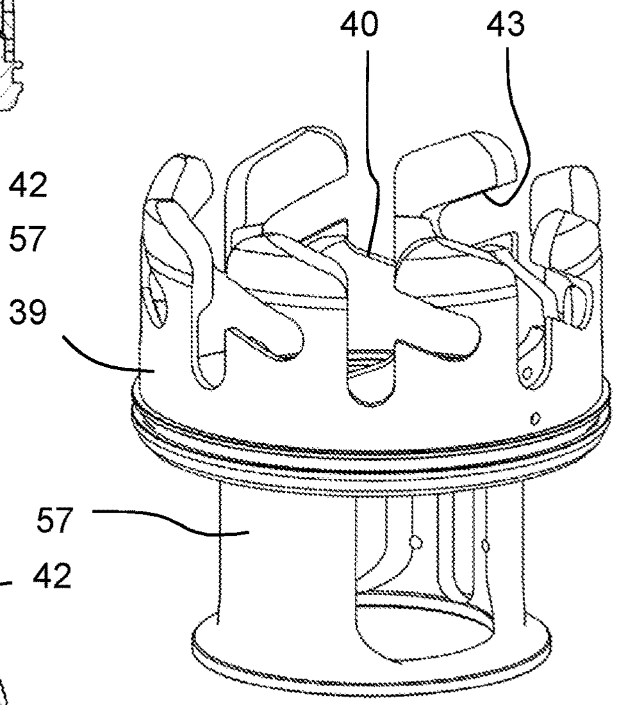
Figure 6C:
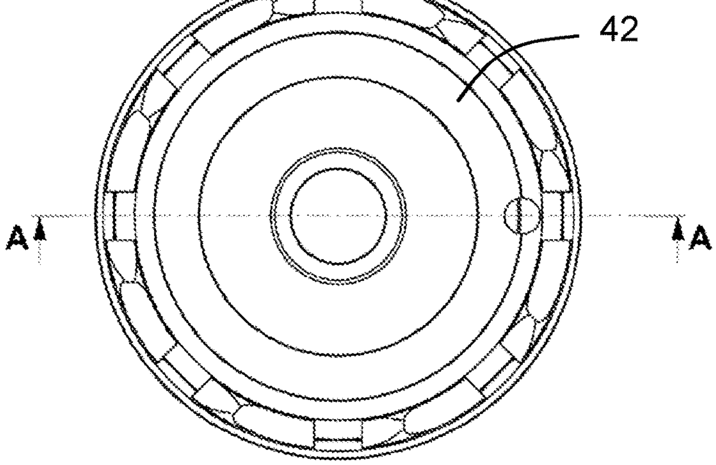
Figure 7B:
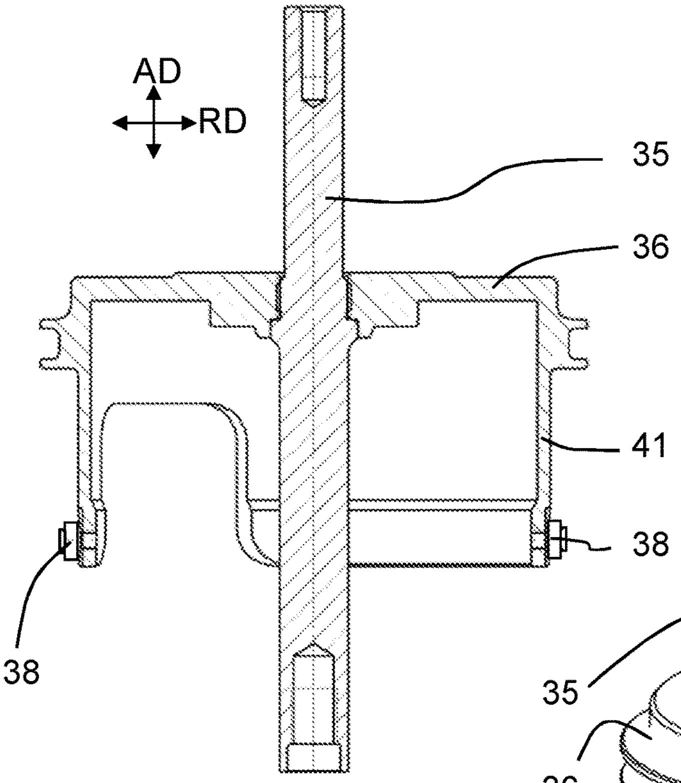
Figure 7A:
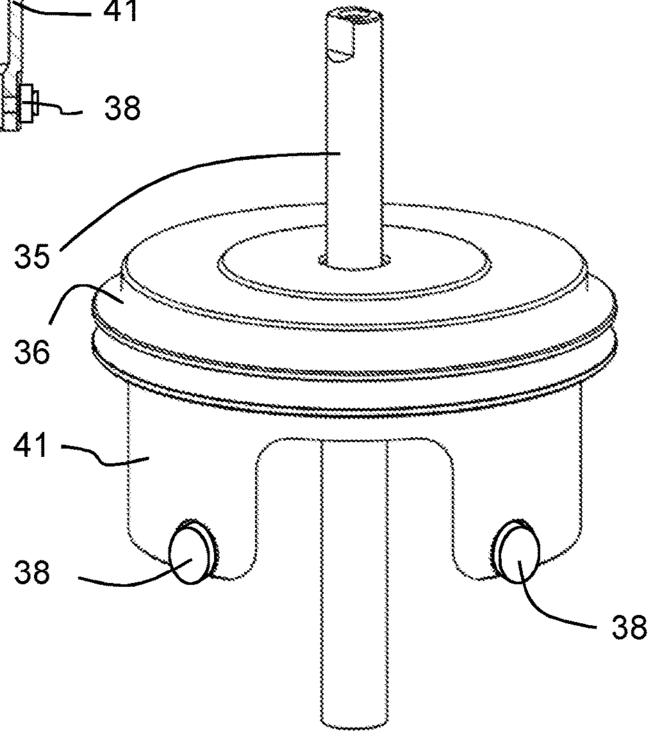
Figure 7C:
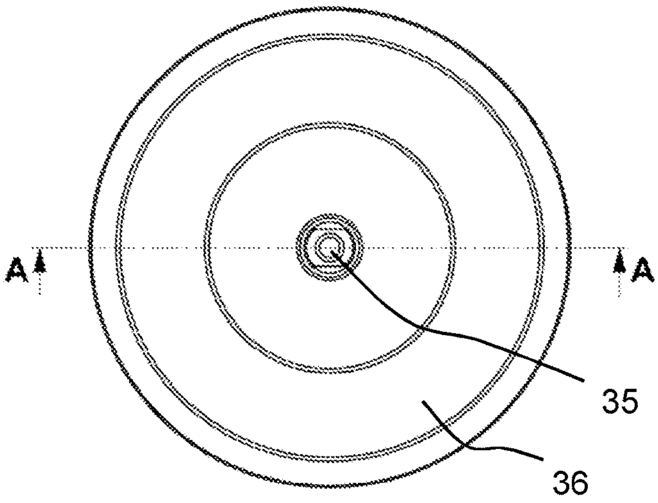

The cam member 39 of FIGS. 6A-C has eight cam-surfaces 40 distributed around the circumference of the cam member 39 for providing the first rotational step, and eight further cam-surfaces 43 distributed around the circumference of the cam member 39 for providing the second rotational step. Hence, the cleaning nozzle according to this example embodiment requires eight activation events for performing a full 360 degree rotation of the first plug 2. However, the number of cam-surfaces may of course be varied according to the specific circumstances and needs.

Furthermore, this two-step design of the cam member 39 is optional and the cam member 39 may be implemented using a single cam surface for each activation event.

The radially protruding guide member 38 may for example be a radially protruding pin, slider, or roller. As depicted in FIG. 2C, the guide member 38 may even be roller having a roller bearing 44 for further reduced frictional losses.

According to some example embodiments, the rotating mechanism 37 may include a set of at least two radially protruding guide members 38 rotationally connected with a piston 36 of the pneumatic linear actuator 27, and a cam member 39 rotationally secured to the stationary actuator housing 34, wherein the piston 36 is rigidly connected and rotationally secured to the first plug 2, and wherein the cam member 39 has at least two cam-surfaces inclined with respect to the axial direction and configured for interacting with the radially protruding guiding members 38 for inducing a controlled rotation of the piston 36 and first plug 2 upon axial motion of the piston 36 and first plug 2 from the retracted position to the protruding position, and back to the retracted position again.

With reference to FIGS. 6A-6C, the cam member 39 of the rotating mechanism 37 may according to some example embodiments include first and second annular sleeves 39*a*, 39*b* mutually joined and axially overlapping, wherein each of the first and second annular sleeves 39*a*, 39*b* includes at least one cam-surface 40, 43 inclined with respect to the axial direction AD, wherein the at least one radially protruding guide member 38 is configured for interacting with the at least one cam-surface 40 of the first annular sleeve 39*a* when the first plug 2 moves from the retracted position to the protruding position, and wherein the at least one radially protruding guide member 38 is configured for interacting with the at least one cam-surface 43 of the second annular sleeve 39*b* when the first plug 2 moves from the protruding position to the retracted position.

The exact number of radially protruding guide members 38 may depend on the specific circumstances, and may for example be in the range of 2-16 individual guide members 38.

Similarly, the rotating mechanism may, depending on the circumstances, be arranged to perform a suitably large angular rotations for each activation event. For example, rotating mechanism may be arranged such that 4-24 consecutive activation events, specifically, 6-12 consecutive activation events, will result in the first plug performing a full turn, i.e. rotating at least 360 degrees around the central axis 8.

The cleaning nozzle 1 is not limited to the example embodiment of FIGS. 2A, 2C, 3A, 6A-C and 7A-C and various changes may be made to the cleaning nozzle 1 and/or rotating mechanism 37. For example, with respect to the rotating mechanism, the cam member 39 may be rotationally connected with the piston 36 and/or first plug 2, and the radially protruding guide members 38 may be rotationally secured to the stationary actuator housing 34. Furthermore, the rotating mechanism 37 including the radially protruding guide members 38 and the cam member 39 may even be implemented in the nozzle housing 3 instead, thereby enabling use of a more conventional linear actuator.

The linear actuator 27 may have a housing 34 for surrounding the piston and rotating mechanism 37, wherein the housing 34 includes a rear wall 46, a front wall 42 and a cylindrical wall 47 extending between the front and rear walls 42, 46.

In the example embodiment of FIGS. 2A and 3A, the actuating member 35 extends rearwards through the rear wall 46 of the linear actuator 27 for enabling for example position detection of the linear actuator 27 using a suitable sensor device. However, this is optional and the actuating member 35 may alternatively not extend through the rear wall 46, which may then be closed instead.

Depending on the overall design of the retractable cleaning nozzle 1, a spacer 57 may be provided between the linear actuator 27 and nozzle housing 3. In the example embodiment of FIGS. 2A and 3A, the spacer 57 is integrated in the front wall 42 of the actuator 27.

The linear actuator 37 is for example a pneumatically or hydraulically operated single-acting cylinder-piston actuator with a mechanical return spring 45 for biasing the piston 36 towards a rear position of the piston 36. The return spring 45 may thus be installed between a front wall 42 of the actuator housing 34 and front side of the piston 36.

Furthermore, as illustrated in FIG. 2D, the cylinder-piston actuator 27 may additionally include a roller bearing 70 arranged between the mechanical spring 45 of the first plug 2 and the piston 36 for simplifying relative rotation of the mechanical spring 45 and piston 36, if the linear actuator 27 has a rotating mechanism 37 integrated therein.

With reference to FIGS. 1 and 4B, the first set of spray holes 11 provided in the front wall 10 of the sleeve-shaped body 9 may be arranged in one, two, three, four or more individual front clusters 48 of spray holes 11, wherein each spray hole 11 of an individual front cluster 48 may be located within a circular sector 49 that having a central angle 50 of not more than 90 degrees, specifically with a circular sector that having a central angle of not more than 45 degrees.

For example, the first set of spray holes 11 provided in the front wall 10 of the sleeve-shaped body 9 may be arranged in two individual and oppositely located front clusters 48 of spray holes 11, wherein each spray hole 11 of an individual front cluster 48 may be located within a circular sector 49 that having a central angle 50 of not more than 45 degrees. According to some example embodiments, each front cluster 48 includes about 5-15 spray holes.

Figure 13:
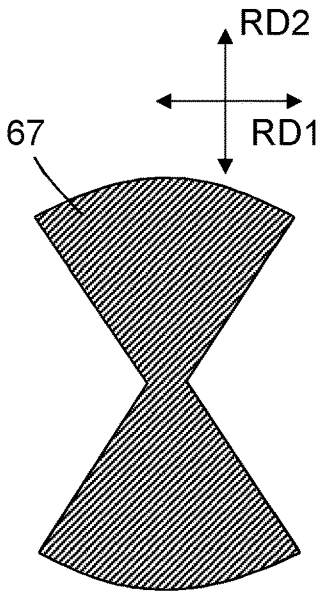
FIG. 13 shows an example of an asymmetric ejection pattern.

Thereby, the resulting ejection pattern of the first set of spray holes 11 may be relatively narrow in a first radial direction RD1 and relatively wide in a second radial direction RD2 located substantially perpendicular to the first radial direction, as schematically illustrated in FIG. 13. This type of ejection pattern may be particularly suitable for a rotatable first plug 2 because the relatively narrow ejection pattern enables stronger ejection pressure without requiring higher pump capacity, and a satisfactory cleaning performance is still obtained due to the rotatable first plug 2, i.e. rotatable ejection pattern.

In other words, the non-evenly distributed cluster-shaped first set of spray holes 11 enables either maintained cleaning liquid ejection pressure with reduced pump supply pressure, or increased liquid ejection pressure with maintained pump supply pressure.

Figure 4D:
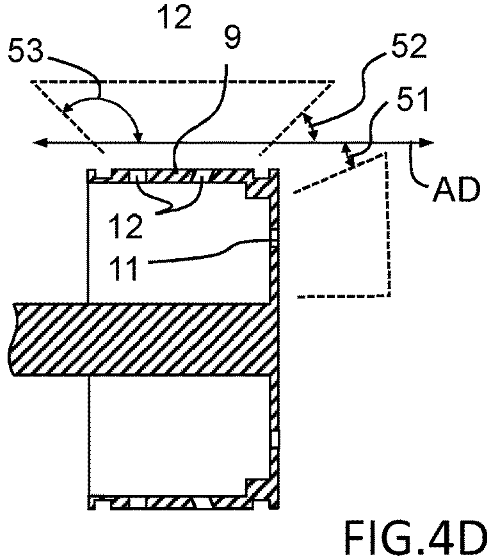
FIG. 4D shows example ejection angles of a first plug.

FIG. 4D schematically shows an example embodiment of a first plug 2 having a first set of spray holes 11 and a second set of spray holes 12, wherein the first set of spray holes 11 provided in the front wall 10 of the sleeve-shaped body 9 are arranged to eject cleaning liquid with in an angular range of at least 0-30 degrees with respect to the axial direction AD, as depicted by first angle 51. Furthermore, the second set of spray holes 12 provided in the sleeve-shaped body 9 are arranged to eject cleaning liquid with in an angular range of about 45-135 degrees with respect to the axial direction AD, as depicted by the second angle 52 and the third angle 53.

For increasing likelihood that the ejection pressure of the cleaning liquid at the first and second set of spray holes is sufficiently strong, a flow area of the inlet port 6 may be selected to be larger than an accumulated flow area of the first and second sets spray holes 11, 12 taken together. Specifically, the flow area of the inlet port 6 may be selected to be at least two times larger than the accumulated flow area of the first and second sets spray holes 11, 12.

Hence, for example, in case the flow area of the inlet port 6 is about 400 mm2, the accumulated flow area of the first and second sets spray holes 11, 12 taken together may be selected to be not more than 400 mm2, specifically less than 200 mm2. The flow area of the inlet port and/or a spray hole corresponds to the flow area, i.e. effective flow area, of the pipe port or spray opening.

With reference to FIGS. 2A and 3A, the second plug 15 may be movably arranged relative to the first plug 2 in the axial direction AD and spring-loaded towards a front side 14 of the nozzle housing 3 for providing improved sealing contact between the first and second plugs 2, 15 in the retracted position of the first plug 2. The spring-loaded second plug 15 ensures particularly good sealing performance between the front flange 20 of the second plug 15 and the front wall 10 and/or the sleeve-shaped body 9 of the first plug 2.

The spring-loaded second plug 15 may be accomplished in a variety of ways. For example, as schematically illustrated in FIGS. 2A and 3A, the linear actuator 27 may be a pneumatically or hydraulically operated cylinder-piston actuator 27, wherein the second plug 15 extends into the actuator housing 34 via a connection arrangement 55, and wherein a mechanical spring 54 of the second plug 15 is located in the actuator housing 34 and abuts a rear side of the second plug 15, specifically a rear side of a member of the connection arrangement 55, and front side of the piston 36.

Thereby, the second plug 15 is always urged forwards against a valve seat on the rear side of the first plug 2, in the retracted position of the first plug 2. In the protruding position of the first plug 2 the second plug 15 must have some kind of forwards motion limiting arrangement for avoiding that the second sealing arrangement remains in sealing contact with the first plug 2, because this would prevent cleaning liquid from reaching the first set of spray holes. In the example embodiment of illustrated in FIG. 3A, said forwards motion limiting arrangement 56 is implemented by means of flange member of the connection arrangement 55 of the second plug 15 that is configured to abut a rear side 5 of the nozzle housing 3 when the first plug 2 is in the protruding position.

As illustrated in FIG. 2D, the cylinder-piston actuator 27 may additionally include a roller bearing 71 arranged between the mechanical spring 54 of the second plug 15 and the piston 36 for simplifying relative rotation of the mechanical spring 54 and piston 36, if the linear actuator 27 has a rotating mechanism 37 integrated therein.

Figure 8A:
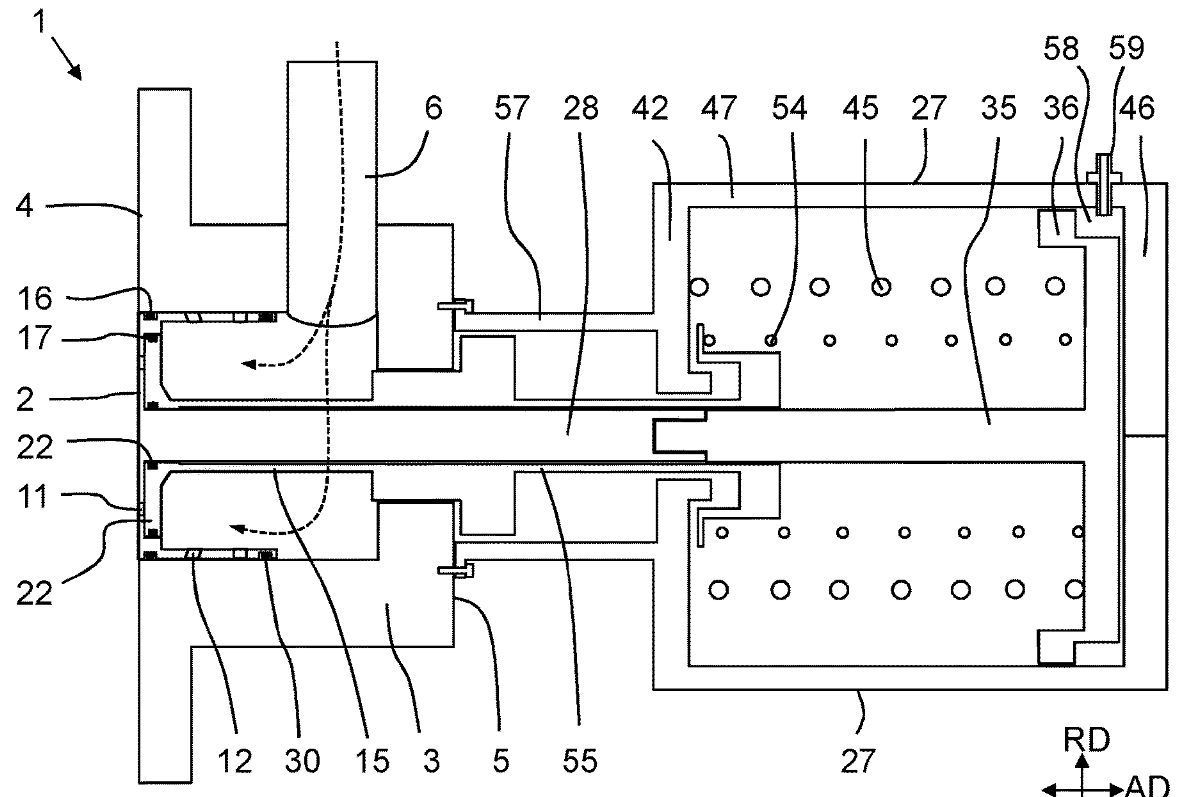
Figure 8B:
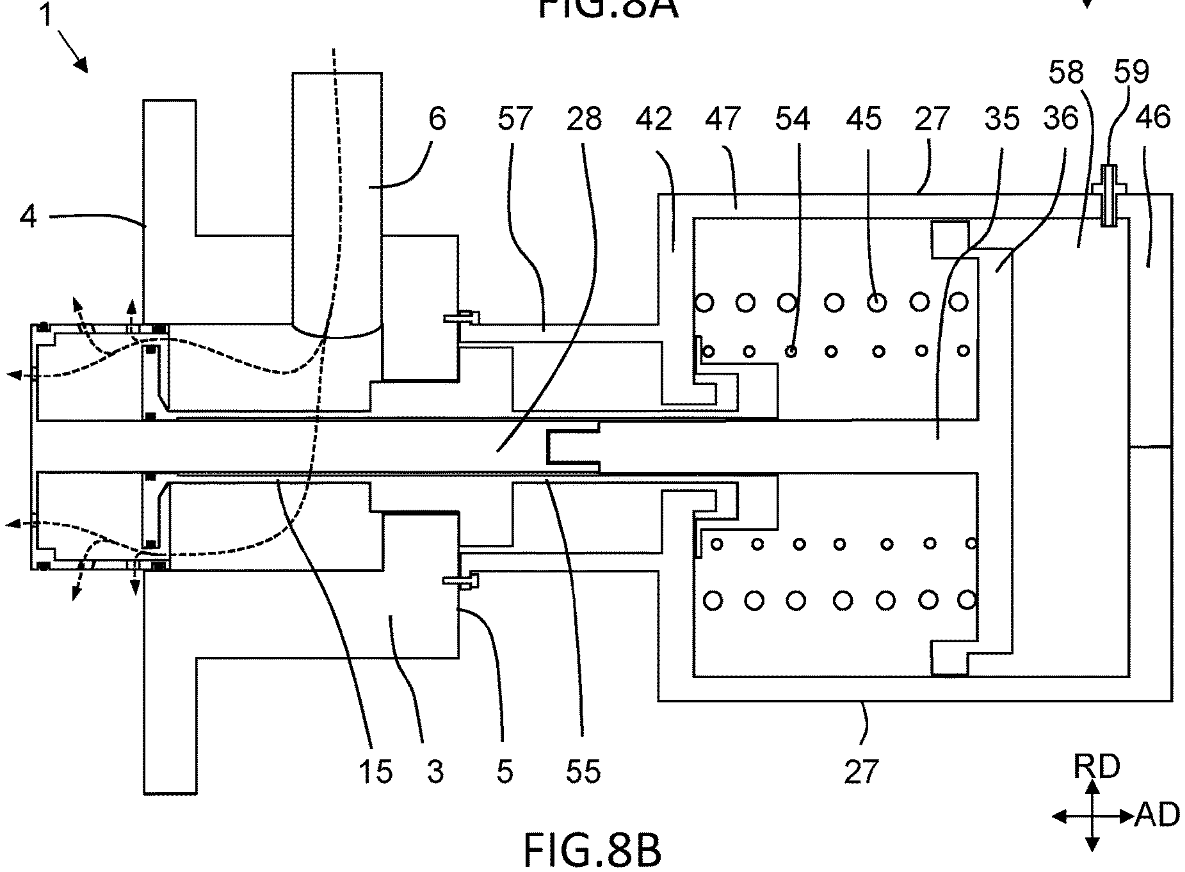

Many alternative embodiments of the retractable cleaning nozzle are possible within the scope of the appended claims. For example, a further example embodiment of the cleaning nozzle 1 is schematically illustrated in retracted state in FIG. 8A and protruding state in FIG. 8B. This example embodiment of the cleaning nozzle corresponds largely to the previously described example embodiment, but without the previously described rotating mechanism 37. However, a rotating mechanism 37 may be implemented in the cleaning nozzle 1 of FIGS. 8A-B if desired. The various part and functionality is not repeated here and reference is instead made to description above and FIGS. 1-7C for detailed description of the parts.

Figure 9A:
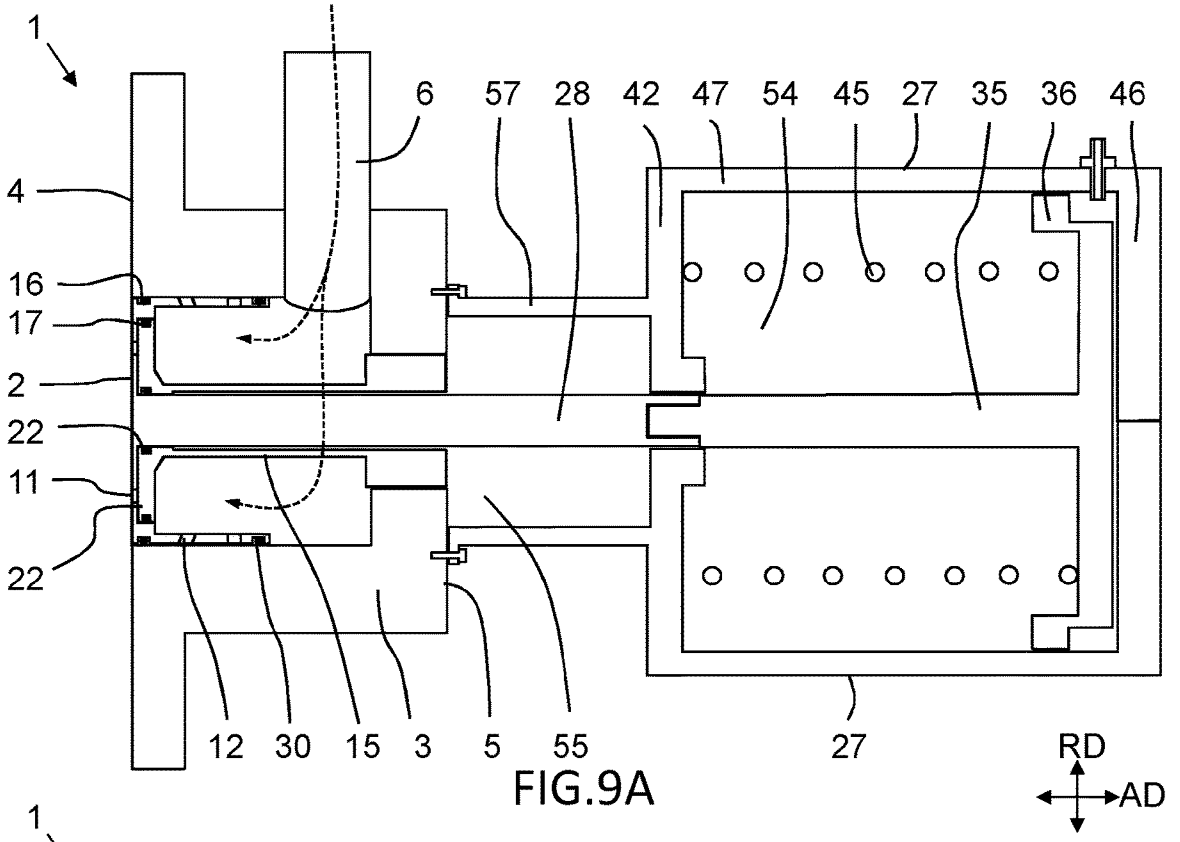
FIG. 9A-9B show cross-sections of still a further example embodiment of the cleaning nozzle in retracted and protruding states.
Figure 9B:
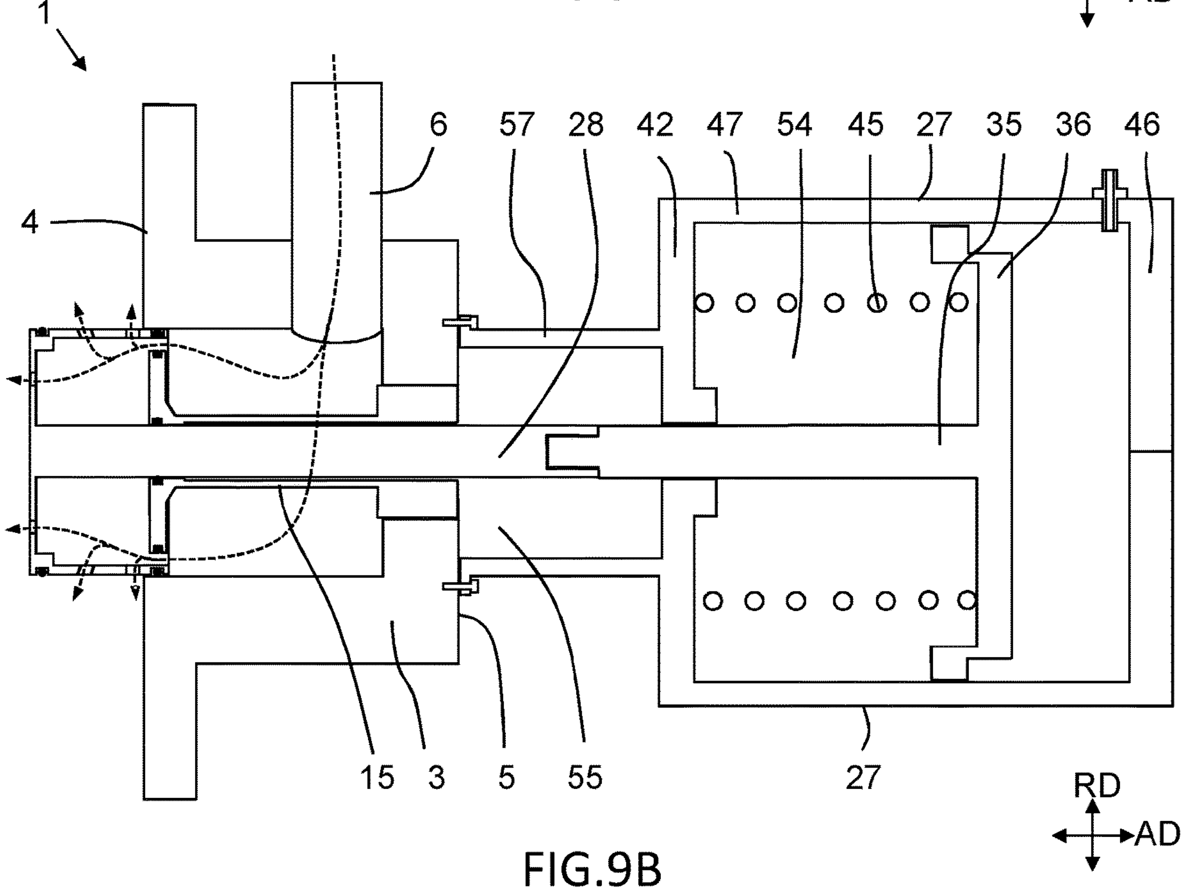

Still a further example embodiment of the cleaning nozzle 1 is schematically illustrated in retracted state in FIG. 9A and protruding state in FIG. 9B. This example embodiment of the cleaning nozzle corresponds largely to the previously described example embodiment, but with a stationary mounted second plug 15. This type of simplified mounting of the second plug 15 provides a more cost-efficient design that may be suitable in some implementations. This cleaning nozzle also lacks the previously described rotating mechanism 37. However, a rotating mechanism 37 may be implemented in the cleaning nozzle 1 of FIGS. 9A-B if desired. The various part and functionality is not repeated here and reference is instead made to description above and FIGS. 1-7C for detailed description of the parts.

Figure 10A:
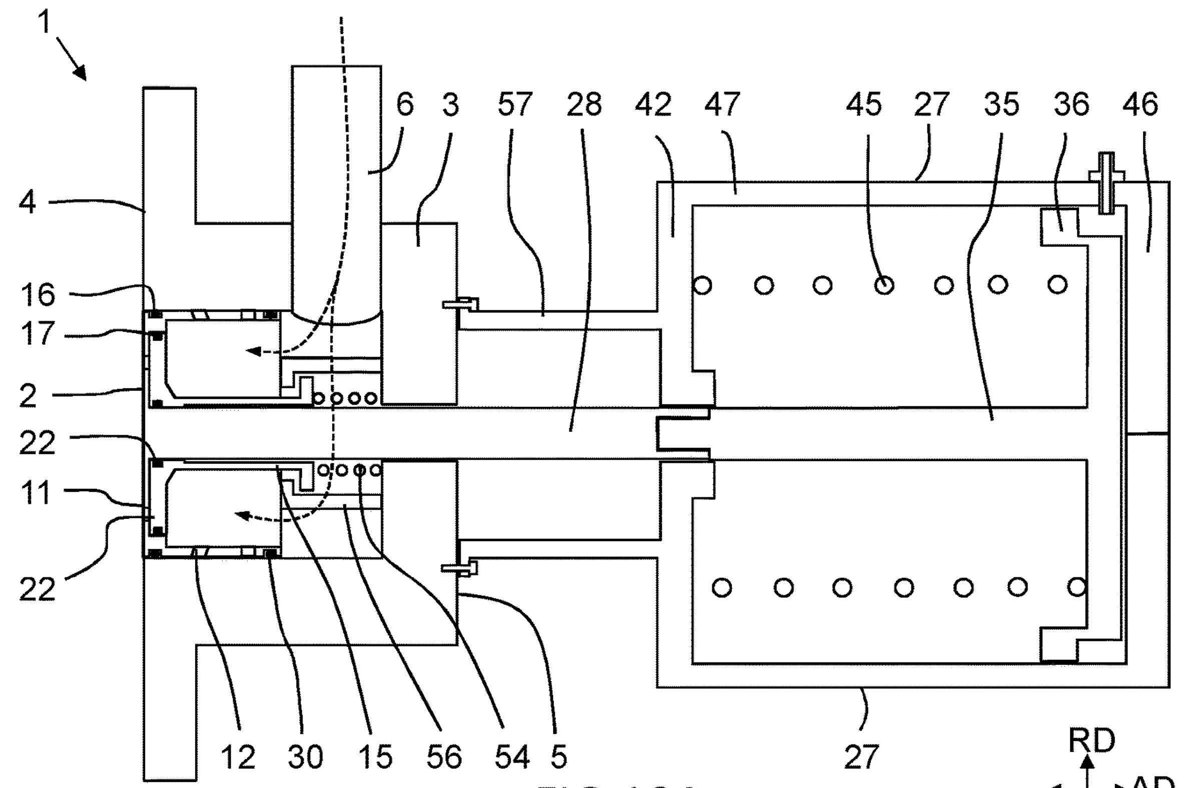
FIG. 10A-10B show cross-sections of still another example embodiment of the cleaning nozzle in retracted and protruding states.
Figure 10B:
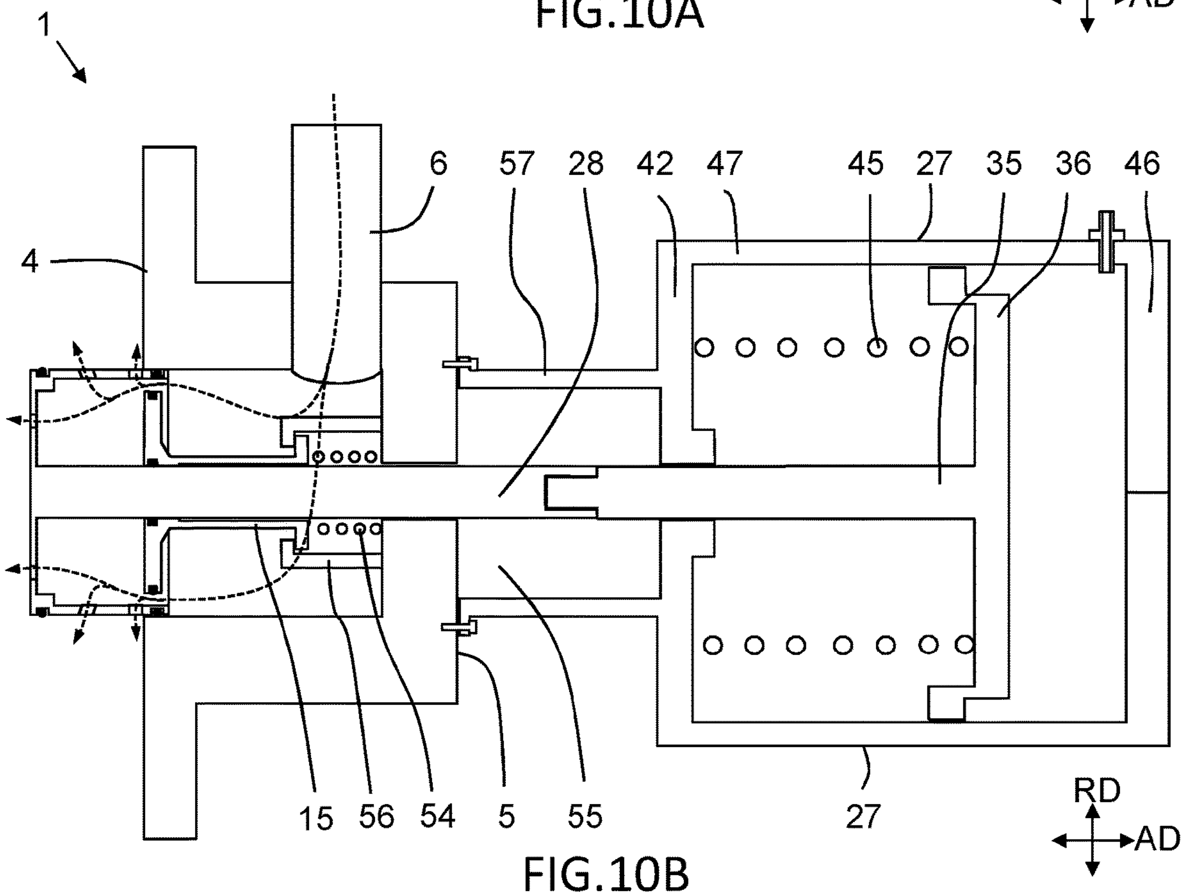

Still a further example embodiment of the cleaning nozzle 1 is schematically illustrated in retracted state in FIG. 10A and protruding state in FIG. 10B. This example embodiment of the cleaning nozzle corresponds largely to the previously described example embodiment, but with the spring 54 of the second plug 15, as well as the forwards motion limiting arrangement 56, installed within the nozzle housing 3 instead. This enables use a simplified linear actuator design. This cleaning nozzle also lacks the previously described rotating mechanism 37. However, a rotating mechanism 37 may be implemented in the cleaning nozzle 1 of FIGS. 10A-B if desired. The various part and functionality is not repeated here and reference is instead made to description above and FIGS. 1-7C for detailed description of the parts.

Figure 11:
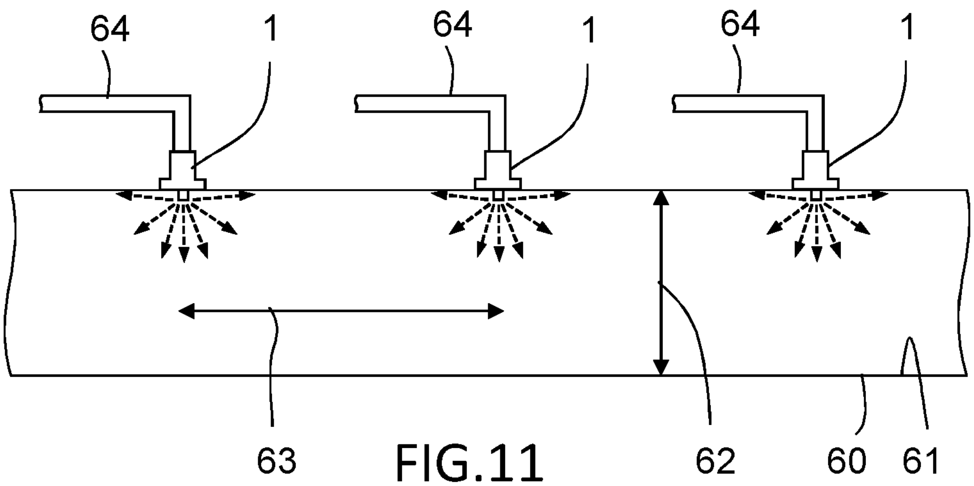
FIG. 11-12 show an assembly of the cleaning nozzle installed in a pipe or tank.
Figure 12:
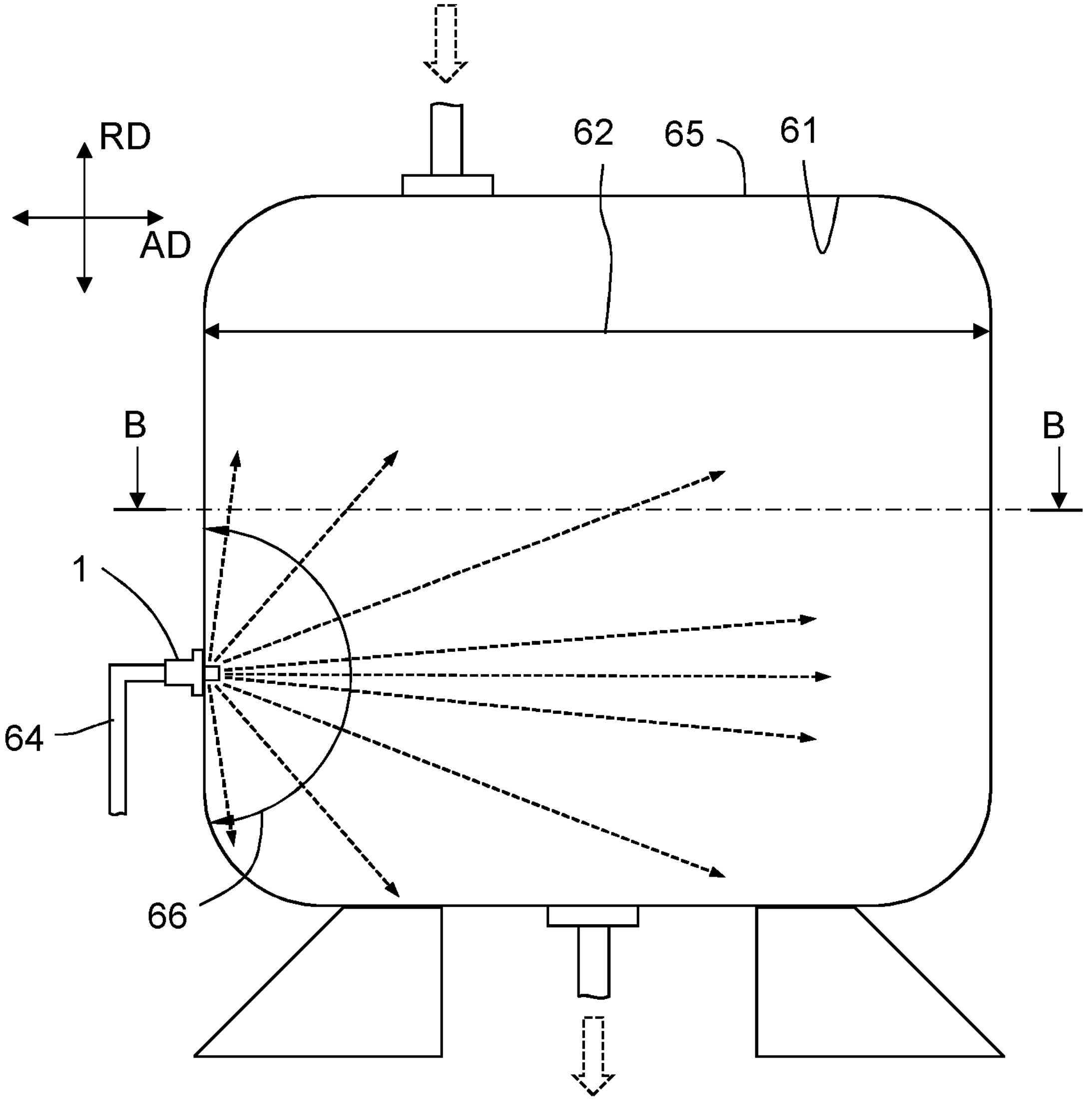

With reference to FIGS. 11 and 12, the disclosure also relates to an assembly comprising a tank or a pipe, and a retractable cleaning nozzle as described above. For example, FIG. 11 shows a portion of pipe 60 having a plurality of retractable cleaning nozzles installed in a wall of the pipe at regularly spaced apart positions from each other. The cleaning nozzles 1 may thus be used for cleaning the interior surface 61 of the pipe 60. The pipe may for example have a diameter 62 in the range of about 0.1-3 metres, specifically about 0.3-1.5 metres. Neighbouring cleaning nozzles may for example be positioned with a distance 63 of about 0.5-3 metres from each other. Each cleaning nozzle 1 receives cleaning fluid via a supply pipe 64 connected to the cleaning nozzle 1.

FIG. 12 schematically shows a tank 65 fora working product, such as a fluid, having an inlet opening, an outlet opening, and a retractable cleaning nozzle 1 installed in wall of the tank 65. The cleaning nozzles 1 may thus be used for cleaning the interior surface 61 of the tank 65. The tank may for example have a diameter 62 in the range of about 1-3 metres, and the cleaning nozzle may thus be configured to have an operating range of at least 3 metres. The cleaning nozzle may be configured to have a relatively large ejection angle 66, i.e. at least 180 degrees, for enabling efficient and reliable cleaning of the interior surface 61 of the tank 65.

The first set of spray holes 11 may be configured to provide an asymmetric ejection pattern 67, as schematically illustrated in FIG. 13, which shows an example of a cross-section of an ejection pattern 67 of the first set of spray holes 11 of a cleaning nozzle 1 for a certain rotational position. However, due to the rotational character of the cleaning nozzle according to certain embodiments, the cleaning nozzle 1 will nevertheless, despite the asymmetric ejection pattern, provide a full coverage of the adjacent interior surface of the tank 65 or pipe 60.

The second set of spray holes 12 arranged within the sleeve-shaped body 9 may also be arranged in asymmetrically, i.e. having an asymmetric ejection pattern that requires a rotating mechanism 37 for providing full coverage of the adjacent interior surface of the tank or pipe, and thereby further contributing to improved cost-efficiency and energy-efficient design of the cleaning nozzle 1.

Figure 14:
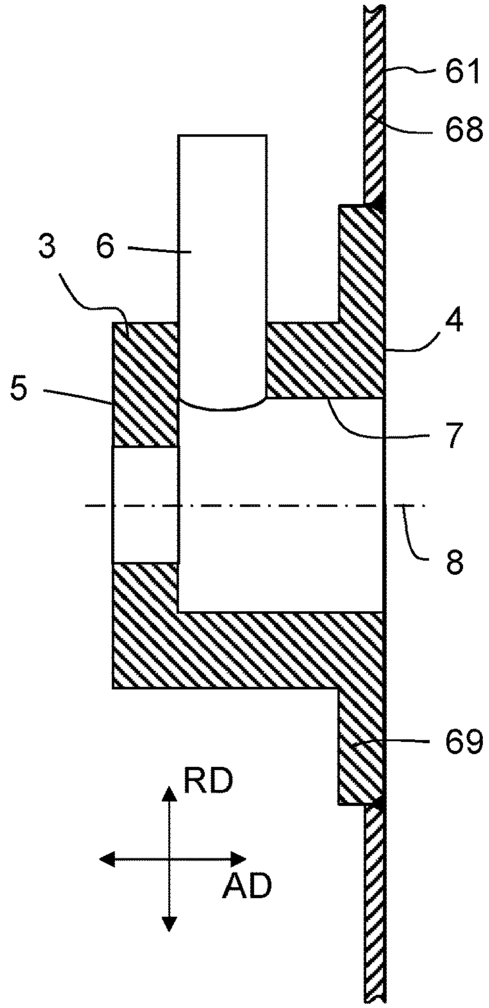
FIG. 14 shows a nozzle housing attached to a side wall.

FIG. 14 schematically shows only the nozzle housing 3 of the retractable cleaning nozzle 1 stationary mounted in a hole of a side wall 68 of the pipe 60 or the tank 65. The nozzle housing 3 may for example have a mounting flange 69 that is welded to the side wall 68 at the opening. The front side 4 of the nozzle housing is arranged to face towards the interior of the tank or pipe, and the front surface 4 of the housing 3 is preferably arranged substantially flush with the interior surface 61 of the side wall 68 of the tank 65 or pipe 60.

The disclosure also relates to a method for spray cleaning an interior surface of a pipe 60 or a tank 65 using a retractable cleaning nozzle 1, which has a nozzle housing 3 stationary mounted in a hole of a side wall 68 of the pipe 60 or tank 65. The nozzle housing 3 may have a front side 4 facing towards the interior of the pipe 60 or tank 65 and a rear side 5 facing away from the interior of the pipe or tank. The nozzle housing 3 may further have an inlet port 6 for receiving a cleaning liquid, a cylindrical interior bore 7 with a central axis 8 defining an axial direction AD, a first plug 2 movably arranged in the axial direction within the bore 7, and a second plug 15.

Figure 15:
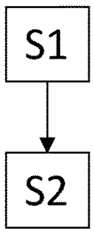
FIG. 15-16 show main steps of some example methods of use of the cleaning nozzle.

FIG. 15 schematically shows the main steps. Specifically, the method comprises a first step S1 of controlling a linear actuator 27 operatively connected to the moveable first plug 2 for moving the first plug 2 from the a retracted position to a protruding position, in which a front portion of the first plug 2, including a first and a second set of spay holes 11, 12, protrudes into the tank or pipe, thereby initiating ejection of cleaning fluid via the first set of spray holes 11 of the first plug 2 substantially in the axial direction AD, and initiating ejection of cleaning fluid via the second set of spray holes 12 of the first plug 2 substantially in a radial direction RD perpendicular to the axial direction AD.

The method comprises a second step S2 of controlling the linear actuator 27 for moving the first plug 2 from the protruding position to the retracted position, in which a front surface 13 of the first plug 2 is substantially flush with a front surface 14 of the nozzle housing 3, and in which the second plug 15 closes the flow path from the inlet port 6 to the first set of spray holes 11 of the first plug 2.

Figure 16:
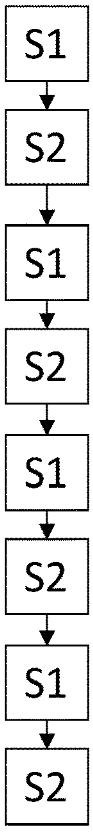

According to some example embodiments, the retractable cleaning nozzle 1 may further comprise a rotating mechanism 37 arranged to cause the first plug 2 to become angularly displaced a predetermined angle, around its central longitudinal axis during each activation event, which involves moving the first plug 2 from the retracted position to the protruding position, and back to the retracted position again. The above-described method for spray cleaning an interior surface of a pipe 60 or a tank 65 using a retractable cleaning nozzle 1 may in such case involve repeating said first and second steps S1, S2 of controlling the linear actuator to move the first plug from the a retracted position to a protruding position, and subsequently to move the first plug back from the protruding position to the retracted position, at least four times, as schematically illustrated by the method steps of FIG. 16, during a cleaning event, for providing at least one full turn of the first plug 2 during a cleaning event.

It will be appreciated that the above description is merely exemplary in nature and is not intended to limit the present disclosure, its application or uses. While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, modifications may be made to adapt a particular situation or material to the teachings of the present disclosure without departing from the essential scope thereof.

Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims. Reference signs mentioned in the claims should not be seen as limiting the extent of the matter protected by the claims, and their sole function is to make claims easier to understand.

| | REFERENCE SIGNS |
|---|---|
| 1. | Retractable cleaning nozzle |
| 2. | First plug |
| 3. | Nozzle housing |
| 4. | Front side of housing |
| 5. | Rear side of housing |
| 6. | Inlet port |
| 7. | Interior bore of housing |
| 8. | Central axis of bore |
| 9. | Sleeve-shaped body |
| 10. | Front wall |
| 11. | First set of spray holes |
| 12. | Second set of spray holes |
| 13. | Front surface of first plug |
| 14. | Front surface of housing |
| 15. | Second plug |
| 16. | First sealing arrangement |
| 17. | Second sealing arrangement |
| 18. | Annular recess for holding first sealing arrangement |
| 19. | Front portion of the sleeve-shaped body |
| 20. | Flange of second plug |
| 21. | Annular recess for holding second sealing arrangement |
| 22. | Third sealing arrangement |
| 23. | Annular recess for holding third sealing arrangement |
| 24. | Central shaft of second plug |
| 25. | Forwards facing surface of second plug |
| 26. | Rearwards facing surface of front wall |
| 27. | Linear actuator |
| 28. | Operating stem of first plug |
| 29. | Central hole of second plug |
| 30. | Fourth sealing arrangement |
| 31. | Annular recess for holding fourth sealing arrangement |
| 32. | Rear portion of the sleeve-shaped body |
| 33. | Inner surface of first plug |
| 34. | Actuator housing |
| 35. | Actuating member |
| 36. | Piston |
| 37. | Rotating mechanism |
| 38. | Radially protruding guide member |
| 39. | Cam member |
| 40. | Cam surface |
| 41. | Sleeve member of piston |
| 42. | Front wall of actuator housing |
| 43. | Further cam surface |
| 44. | Roller bearing of guide member |
| 45. | Spring of first plug |
| 46. | Rear wall of actuator housing |
| 47. | Cylindrical wall of actuator housing |
| 48. | Individual front cluster |
| 49. | Circular sector |
| 50. | Central angle |

-continued

| REFERENCE SIGNS | |
|---|---|
| 51. | First angle |
| 52. | Second angle |
| 53. | Third angle |
| 54. | Spring of second plug |
| 55. | Connection arrangement of second plug |
| 56. | Forwards motion limiting arrangement |
| 57. | Spacer |
| 58. | Pressure chamber |
| 59. | Air supply connector |
| 60. | Pipe |
| 61. | Interior surface |
| 62. | Diameter of pipe |
| 63. | Distance between nozzles |
| 64. | Supply pipe |
| 65. | Tank |
| 66. | Ejection angle |
| 67. | Ejection pattern |
| 68. | Side wall |
| 69. | Mounting flange |
| 70. | Roller bearing of spring of first plug |
| 71. | Roller bearing of spring of second plug |
| 72. | Protruding distance |

The invention claimed is:

1. A retractable cleaning nozzle for spray cleaning an interior surface of a pipe or a tank, the cleaning nozzle comprising:

a nozzle housing configured to be stationary mounted in a hole of the side wall of the pipe or tank and having a front side arranged to face towards the interior of the pipe or tank and a rear side arranged to face away from the interior of the pipe or tank, an inlet port configured for receiving a cleaning fluid, and a cylindrical interior bore with a central axis defining an axial direction, wherein the interior bore is open towards the front side of the nozzle housing;

a first plug movably arranged in the axial direction within the bore of the nozzle housing between a retracted position and a protruding position, wherein the first plug has a sleeve-shaped body with a front wall closing a front portion of the sleeve-shaped body, wherein the front wall of the sleeve-shaped body includes a first set of spray holes configured to eject cleaning fluid substantially in the axial direction, wherein the sleeve-shaped body of the first plug includes a second set of spray holes configured to eject cleaning fluid substantially in a radial direction perpendicular to the axial direction, wherein a front surface of the first plug is substantially flush with a front surface of the nozzle housing in the retracted position of the first plug, and wherein a front portion of the first plug, including the first and second set of spray holes, protrudes beyond the front surface of the nozzle housing in the protruding position of the first plug for enabling spray cleaning of the interior surface of the pipe or tank; and a second plug arranged within a space defined by the sleeve-shaped body of the first plug and configured for closing a flow path from the inlet port to the first set of holes of the first plug when the first plug is located in the retracted position.

2. The retractable cleaning nozzle according to claim 1, further comprising:

a first sealing arrangement for sealing the first plug to the nozzle housing; and a second sealing arrangement for sealing the second plug to the first plug.

3. The retractable cleaning nozzle according to claim 1, wherein the first plug further has a central cylindrical operating stem extending in the axial direction, and wherein the second plug has a central cylindrical hole extending in the axial direction and configured to receive the operating stem of the first plug.

4. The retractable cleaning nozzle according to claim 1, further comprising a linear actuator operatively connected to the moveable first plug for controlling movement of the first plug between the retracted position and the protruding position.

5. The retractable cleaning nozzle according to claim 1, further comprising a rotating mechanism arranged to cause the first plug to become angularly displaced a predetermined angle around a central longitudinal axis thereof during each activation event, which involves moving the first plug from the retracted position to the protruding position, and back to the retracted position again.

6. The retractable cleaning nozzle according to claim 5, wherein the rotating mechanism includes:

at least one radially protruding guide member rotationally connected with the first plug and a cam member rotationally connected with the stationary nozzle housing or an actuator housing, or at least one radially protruding guide member rotationally connected with the stationary nozzle housing or the actuator housing and a cam member rotationally connected with the first plug, wherein the cam member has at least one cam-surface inclined with respect to the axial direction and configured for interacting with the at least one radially protruding guiding member for inducing a controlled rotation of the first plug upon motion of the first plug from the retracted position to the protruding position, and back to the retracted position again.

7. The retractable cleaning nozzle according to claim 6, wherein the cam member of the rotating mechanism includes first and second annular sleeves mutually joined and axially overlapping, wherein each of the first and second annular sleeves includes at least one cam-surface inclined with respect to the axial direction, wherein the at least one radially protruding guide member is configured for interacting with at least one cam-surface of the first annular sleeve when the first plug moves from the retracted position to the protruding position, and wherein the at least one radially protruding guide member is configured for interacting with at least one cam-surface of the second annular sleeve when the first plug moves from the protruding position to the retracted position.

8. The retractable cleaning nozzle according to claim 1, wherein the second plug is movably arranged relative to the first plug in the axial direction and spring-loaded towards a front side of the nozzle housing for providing improved sealing contact with the first plug.

9. The retractable cleaning nozzle according to claim 4, wherein the linear actuator is a pneumatically or hydraulically operated cylinder-piston actuator, wherein the second plug extends into an actuator housing, and wherein a mechanical spring of the second plug is located in the actuator housing and abuts a rear side of the second plug and front side of the piston.

10. The retractable cleaning nozzle according to claim 1, wherein the first set of spray holes provided on the front wall of the sleeve-shaped body are arranged in one or more individual front clusters of spray holes, wherein each spray hole of an individual front cluster is located within a circular sector having a central angle of not more than 90 degrees.

11. The retractable cleaning nozzle according to claim 1, wherein the front surface of the first plug has a substantially flat surface arranged in a plane perpendicular to the axial direction, and the first set of spray holes is arranged in said substantially flat surface.

12. The retractable cleaning nozzle according to claim 1, wherein the first set of spray holes provided on the front wall of the sleeve-shaped body are arranged to eject cleaning liquid within an angular range of at least 0-30 degrees with respect to the axial direction, and the second set of spray holes provided in the sleeve-shaped body are arranged to eject cleaning liquid within an angular range of about 45-135 degrees with respect to the axial direction.

13. An assembly comprising:
- a tank or a pipe; and
- the retractable cleaning nozzle according to claim 1,
- wherein the nozzle housing of the retractable cleaning nozzle is stationary mounted in a hole of a side wall of the pipe or the tank with a front side arranged to face towards the interior of the tank or pipe.

14. The retractable cleaning nozzle according to claim 1, further comprising:
- a first sealing arrangement for sealing an annular space between the first plug and the nozzle housing; and
- a second sealing arrangement for sealing an annular space between the second plug and the first plug.

15. The retractable cleaning nozzle according to claim 1, further comprising a rotating mechanism arranged to cause the first plug to become angularly displaced a predetermined angle in the range of 5-175 degrees around a central longitudinal axis thereof during each activation event, which involves moving the first plug from the retracted position to the protruding position, and back to the retracted position again.

16. The retractable cleaning nozzle according to claim 1, further comprising a rotating mechanism arranged to cause the first plug to become angularly displaced a predetermined angle in the range of 20-110 degrees around a central longitudinal axis thereof during each activation event, which involves moving the first plug from the retracted position to the protruding position, and back to the retracted position again.

17. The retractable cleaning nozzle according to claim 1, wherein the second plug is movably arranged relative to the first plug in the axial direction and spring-loaded towards a front side of the nozzle housing for providing improved sealing contact with the front wall and/or the sleeve-shaped body of the first plug.

18. The retractable cleaning nozzle according to claim 1, wherein the first set of spray holes provided on the front wall of the sleeve-shaped body are arranged in one or more individual front clusters of spray holes, wherein each spray hole of an individual front cluster is located within a circular sector having a central angle of not more than 45 degrees.

* * * * *